(12) United States Patent
Huang et al.

(10) Patent No.: US 10,502,932 B2
(45) Date of Patent: Dec. 10, 2019

(54) PLASTIC OPTICAL LENS ASSEMBLY, IMAGING LENS MODULE AND ELECTRONIC DEVICE

(71) Applicant: LARGAN PRECISION CO., LTD., Taichung (TW)

(72) Inventors: Hsuan-Chin Huang, Taichung (TW); Hsiang-Chi Tang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 181 days.

(21) Appl. No.: 15/465,786

(22) Filed: Mar. 22, 2017

(65) Prior Publication Data

US 2018/0129017 A1    May 10, 2018

(30) Foreign Application Priority Data

Nov. 8, 2016   (TW) .............................. 105136313 A

(51) Int. Cl.
*G02B 9/04*   (2006.01)
*G02B 13/00*  (2006.01)
*G02B 1/04*   (2006.01)
*H04M 1/02*   (2006.01)

(52) U.S. Cl.
CPC .......... *G02B 13/006* (2013.01); *G02B 1/041* (2013.01); *H04M 1/0266* (2013.01)

(58) Field of Classification Search
CPC ...... G02B 13/18; G02B 13/04; G02B 13/004; G02B 13/0045; G02B 9/04; G02B 7/021
USPC .................................................. 359/793–795
See application file for complete search history.

(56) References Cited

U.S. PATENT DOCUMENTS

| | | | |
|---|---|---|---|
| 7,042,659 B2 | 5/2006 | Huang et al. |
| 7,068,448 B2 | 6/2006 | Huang |
| 7,088,530 B1 | 8/2006 | Recco et al. |
| 8,934,183 B2 | 1/2015 | Maetaki |
| 9,304,233 B2 | 4/2016 | Kim |
| 9,372,322 B2 | 6/2016 | Yan et al. |
| 2015/0146310 A1 | 5/2015 | Choi |
| 2015/0260939 A1 | 9/2015 | Yan et al. |
| 2015/0260940 A1 | 9/2015 | Yan et al. |
| 2015/0323708 A1 | 11/2015 | Hashimoto et al. |
| 2017/0176649 A1 | 6/2017 | Chang |

FOREIGN PATENT DOCUMENTS

| | | |
|---|---|---|
| JP | 2014-119707 A | 6/2014 |
| TW | M520143 U | 4/2016 |

*Primary Examiner* — William R Alexander
*Assistant Examiner* — Tamara Y. Washington
(74) *Attorney, Agent, or Firm* — McClure, Qualey & Rodack, LLP

(57) ABSTRACT

A plastic optical lens assembly includes a first lens element, a second lens element and a cementing glue coating. A first spacing section is located between a first optical effective portion and a first engaging structure. A second optical effective portion is disposed correspondingly to the first optical effective portion. A second spacing section is located between the second optical effective portion and a second engaging structure. The first engaging structure is engaged with the second engaging structure. A reference space is between the first and the second spacing section. The cementing glue coating is at least disposed between the first and the second optical effective portions, and the first and the second lens elements are cemented by the cementing glue coating.

14 Claims, 25 Drawing Sheets

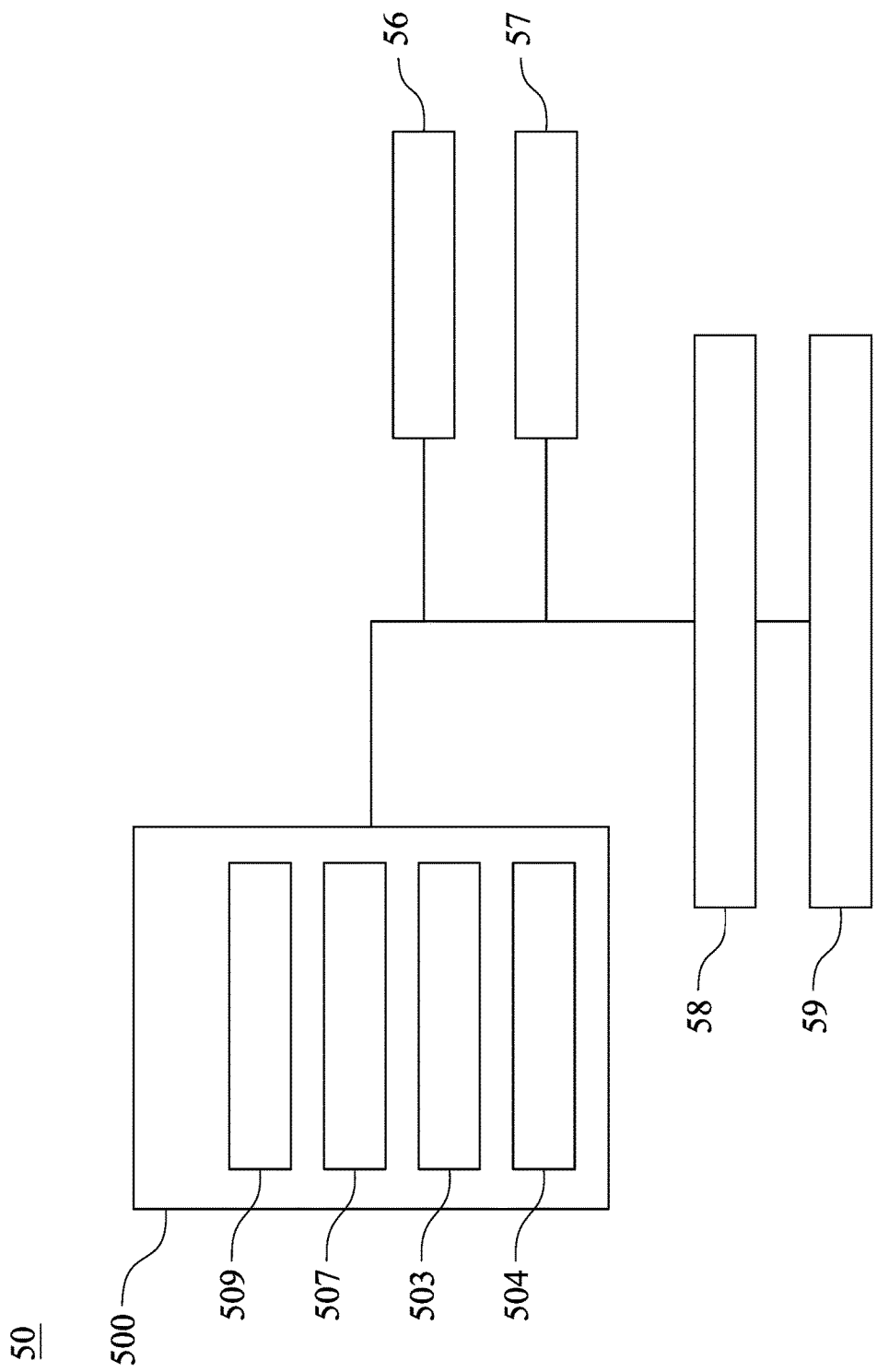

PLASTIC OPTICAL LENS ASSEMBLY, IMAGING LENS MODULE AND ELECTRONIC DEVICE

RELATED APPLICATIONS

This application claims priority to Taiwan Application Serial Number 105136313, filed Nov. 8, 2016, which is herein incorporated by reference.

BACKGROUND

Technical Field

The present disclosure relates to a plastic optical lens assembly and an imaging lens module. More particularly, the present disclosure relates to a plastic optical lens assembly and an imaging lens module applied to portable electronic devices.

Description of Related Art

Along with the popularization of personal electronic products and mobile communication products (such as mobile phones and tablets) having imaging devices, miniaturized imaging lens modules have been correspondingly risen and developed, and the demands of miniaturized imaging lens modules having high resolution and great image quality significantly increased as well.

To satisfy the optical specification of the plastic optical lens assembly in the imaging lens modules, cemented lens element is often incorporated into the plastic optical lens assembly. However, the manufacturing process of the cemented lens element is more complicated than non-cemented lens element, and a curve with high accuracy is needed at the cementing surface between two lens elements to achieve high tightness at the time the two lens elements are cemented. Meanwhile, during the process of cementing, the tightness may be poor because of offsets, and hence the overall optical image quality is affected. For those cemented lens element applied to miniaturized imaging lens module with high optical specification (such as having pixels over 13 mega pixels, aperture value over 1.8, optical image stabilization (OIS), double zoom lens, etc.) the demand of the aligning precision will be stricter. Therefore, a plastic optical lens assembly promoting the tightness and aligning precision of cemented lens element is urgently needed to maintain the image quality and be applicable to the imaging lens module with high optical specification.

SUMMARY

According to one aspect of the present disclosure, a plastic optical lens assembly including a first lens element, a second lens element, and a cementing glue coating is proposed. The first lens element includes a first surface, wherein the first surface includes a first optical effective portion and a first peripheral portion. The first peripheral portion surrounds the first optical effective portion, wherein the first peripheral portion includes a first spacing section and a first engaging structure, and the first spacing section is located between the first optical effective portion and the first engaging structure. The second lens element includes a second surface, wherein the second surface includes a second optical effective portion and a second peripheral portion. The second optical effective portion is disposed correspondingly to the first optical effective portion. The second peripheral portion surrounds the second optical effective portion, wherein the second peripheral portion includes a second spacing section and a second engaging structure, the second spacing section is located between the second optical effective portion and the second engaging structure, the first engaging structure is engaged with the second engaging structure for aligning the first optical effective portion with the second optical effective portion, and a reference space is formed between the first spacing section and the second spacing section. The cementing glue coating is at least disposed between the first optical effective portion and the second optical effective portion, and the cementing glue coating cements the first lens element and the second lens element.

According to another aspect of the present disclosure, an image lens module including the aforementioned plastic optical lens assembly and an image sensor is proposed, wherein the image sensor is disposed on an image surface of the plastic optical lens assembly.

According to another aspect of the present disclosure, an electronic device including the aforementioned image lens module is proposed.

According to another aspect of the present disclosure, a plastic optical lens assembly including a first lens element, a second lens element, and a cementing glue coating is proposed. The first lens element includes a first surface, wherein the first surface includes a first optical effective portion and a first peripheral portion. The first peripheral portion surrounds the first optical effective portion, wherein the first peripheral portion includes a first plane section and a first engaging structure, and the first plane section is perpendicular to an optical axis of the plastic optical lens assembly and is located between the first optical effective portion and the first engaging structure. The second lens element includes a second surface, wherein the second surface includes a second optical effective portion and a second peripheral portion. The second optical effective portion is disposed correspondingly to the first optical effective portion. The second peripheral portion surrounds the second optical effective portion, wherein the second peripheral portion comprises a second plane section and a second engaging structure, the second plane section is perpendicular to the optical axis and is located between the second optical effective portion and the second engaging structure, the first engaging structure is engaged with the second engaging structure for aligning the first optical effective portion with the second optical effective portion, and a reference gap is formed between the first plane section and the second plane section. The cementing glue coating is at least disposed between the first optical effective portion and the second optical effective portion, and the cementing glue coating cementing the first lens element and the second lens element. When a diameter of a width midpoint of one of the first plane section and the second plane section having a narrower width is $\phi d$, an outer diameter of the cementing glue coating is $\phi t$, the following condition is satisfied: 0.08 mm<$(\phi d-\phi t)/2$<$\phi t$ mm.

According to another aspect of the present disclosure, an image lens module including the aforementioned plastic optical lens assembly and an image sensor is proposed, wherein the image sensor is disposed on an image surface of the plastic optical lens assembly.

According to another aspect of the present disclosure, an electronic device including the aforementioned image lens module is proposed.

BRIEF DESCRIPTION OF THE DRAWINGS

The present disclosure can be more fully understood by reading the following detailed description of the embodiment, with reference made to the accompanying drawings as follows:

FIG. 5C is a block diagram of the electronic device of the 5th embodiment;

DETAILED DESCRIPTION

1st Embodiment

Figure 1A:
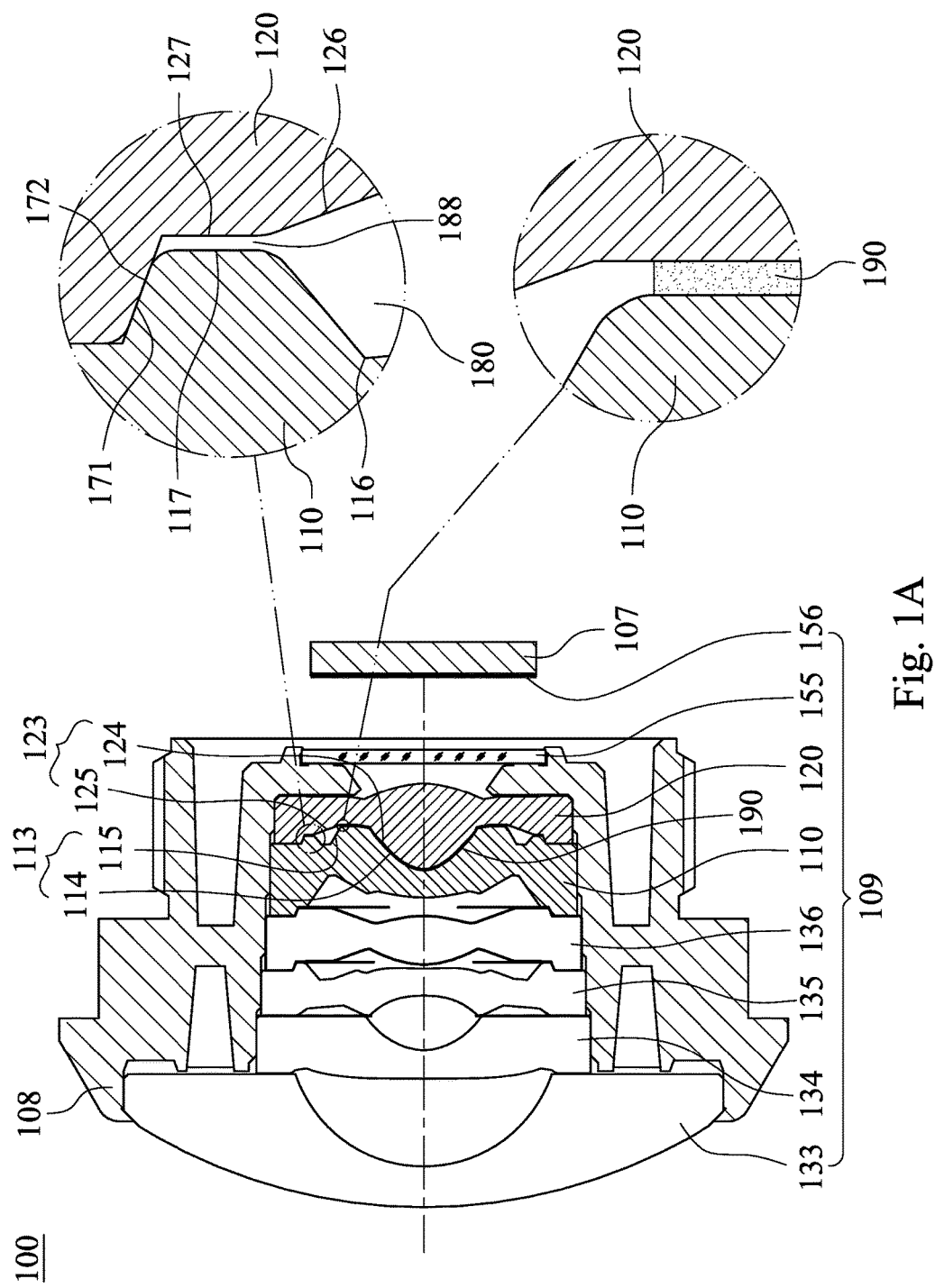
FIG. 1A is a schematic view of an imaging lens module according to the 1st embodiment of the present disclosure.

FIG. 1A is a schematic view of an imaging lens module 100 according to the 1st embodiment of the present disclosure. In FIG. 1A, the imaging lens module 100 includes a plastic optical lens assembly 109 and an image sensor 107, wherein the plastic optical lens assembly 109 includes a first lens element 110, a second lens element 120, and a cementing glue coating 190. The image sensor 107 is disposed on an image surface 156 of the plastic optical lens assembly 109.

In the 1st embodiment, the plastic optical lens assembly 109 includes, in order from an object side to an image side, lens elements 133, 134, 135, 136, the first lens element 110, the second lens element 120, a glass panel 155, and the image surface 156, wherein the plastic optical lens assembly 109 has six lens elements (i.e., the lens elements 133, 134, 135, 136, the first lens element 110, and the second lens element 120), and all of the six lens elements are plastic materials. The cementing glue coating 190 cements the first lens element 110 and the second lens element 120, and all of the lens elements 133, 134, 135, 136, the first lens element 110, the second lens element 120, and the glass panel 155 are disposed inside the plastic barrel 108 along an optical axis of the plastic optical lens assembly 109. In addition, the glass panel 155 can be a cover glass element, a filter, or both, and will not affect the focal length of the plastic optical lens assembly 109. In other embodiments (not shown), a plastic optical lens assembly can have four, five, six, seven, or more lens elements.

Figure 1B:
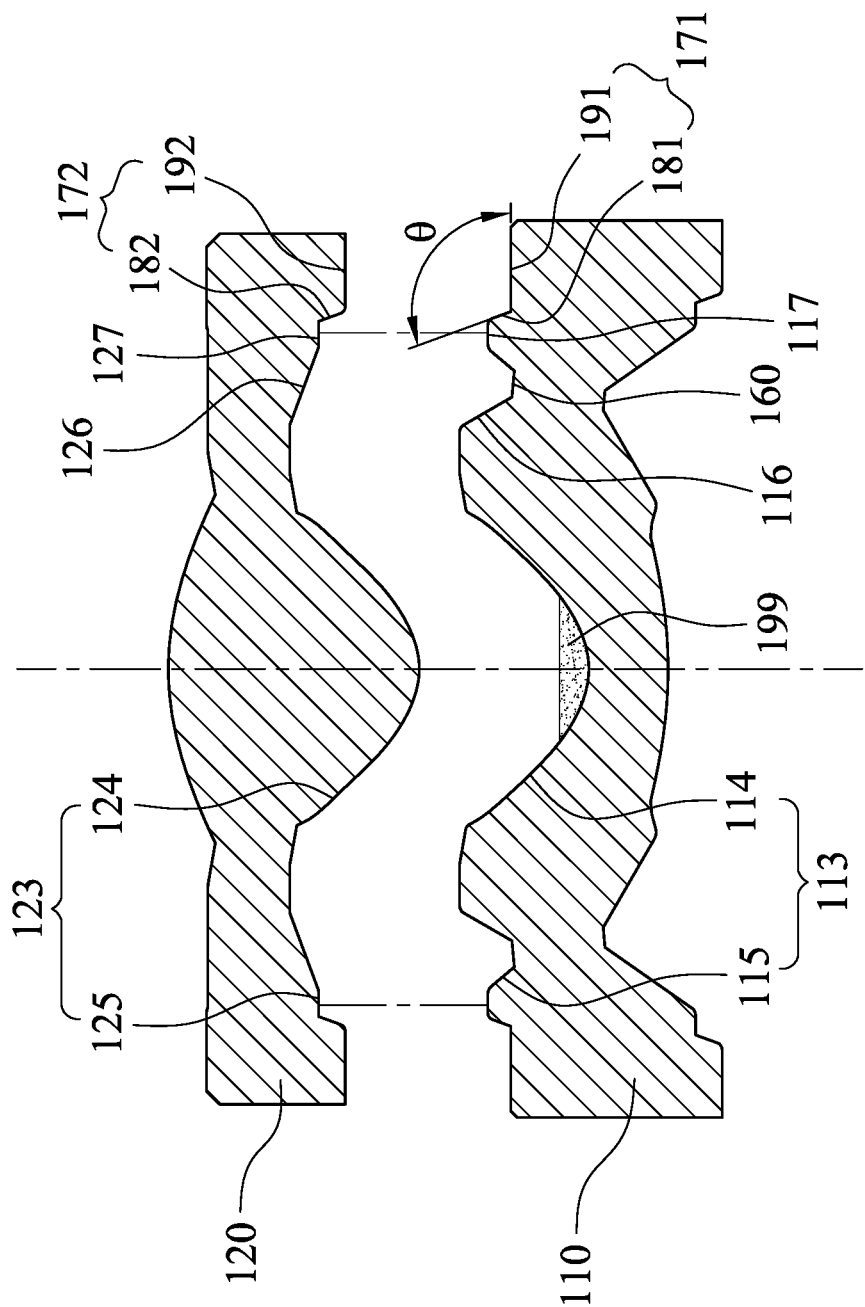
FIG. 1B is a schematic view of assembling the first lens element and the second lens element according to the 1st embodiment.

FIG. 1B is a schematic view of assembling the first lens element 110 and the second lens element 120 according to the 1st embodiment. In FIG. 1A and FIG. 1B, the first lens element 110 includes a first surface 113. The first surface 113 includes a first optical effective portion 114 and a first peripheral portion 115, wherein the first peripheral portion 115 surrounds the first optical effective portion 114. The second lens element 120 includes a second surface 123. The second surface 123 includes a second optical effective portion 124 and a second peripheral portion 125, wherein the second optical effective portion 124 is disposed correspondingly to the first optical effective portion 114, and the second peripheral portion 125 surrounds the second optical effective portion 124. In the 1st embodiment, the first surface 113 is the surface of the first lens element 110 facing the image surface 156, and the first optical effective portion 114 is concave in a paraxial region thereof. The second surface 123 is the surface of the second lens element 120 facing an imaged object (not shown), and the second optical effective portion 124 is convex in a paraxial region thereof.

FIG. 10 is a schematic view of a parameter 2a of the plastic optical lens assembly 109 according to the 1st embodiment. In FIG. 1A and FIG. 10, the cementing glue coating 190 is at least disposed between the first optical effective portion 114 and the second optical effective portion 124, and the cementing glue coating 190 cements the first lens element 110 and the second lens element 120. That is, the first lens element 110 and the second lens element 120 are cemented to form a cemented lens element via at least cementing the first optical effective portion 114 and the second optical effective portion 124.

Specifically, in FIG. 1A and FIG. 1B, the first peripheral portion 115 can include a first spacing section 116 and a first engaging structure 171. The first spacing section 116 is located between the first optical effective portion 114 and the first engaging structure 171. The second peripheral portion 125 can include a second spacing section 126 and a second engaging structure 172. The second spacing section 126 is located between the second optical effective portion 124 and the second engaging structure 172, wherein the first engaging structure 171 is engaged with the second engaging structure 172 for aligning the first optical effective portion 114 with the second optical effective portion 124. To be more specific, a center of the first optical effective portion 114 and a center of the second optical effective portion 124 are aligned via the first engaging structure 171 and the second engaging structure 172. A reference space 180 is formed between the first spacing section 116 and the second spacing section 126, wherein the reference space 180 is an air gap between the first spacing section 116 and the second spacing section 126.

In other words, the first peripheral portion 115 can include the first plane section 117 and the first engaging structure 171. The first plane section 117 is perpendicular to the optical axis of the plastic optical lens assembly 109 and is located between the first optical effective portion 114 and the first engaging structure 171. The second peripheral portion 125 can include the second plane section 127 and the second engaging structure 172. The second plane section 127 is perpendicular to the optical axis and is located between the second optical effective portion 124 and the second engaging structure 172, wherein the first engaging structure 171 is engaged with the second engaging structure 172 for aligning the first optical effective portion 114 with the second optical effective portion 124, and a reference gap 188 is formed between the first plane section 117 and the second plane section 127, wherein the reference gap 188 is an air gap between the first plane section 117 and the second plane section 127.

Accordingly, the tightness and the aligning precision of the cemented lens element formed by the first lens element 110 and the second lens element 120 can be enhanced, and the image quality of the plastic optical lens assembly 109 can be maintained and applicable to the imaging lens module 100 with high optical specification. Further, since the imaging lens module 100 includes the plastic optical lens assembly 109, the plastic optical lens assembly 109 will be helpful for the imaging lens module 100 to maintain the image quality and satisfy high optical specification.

Figure 1C:
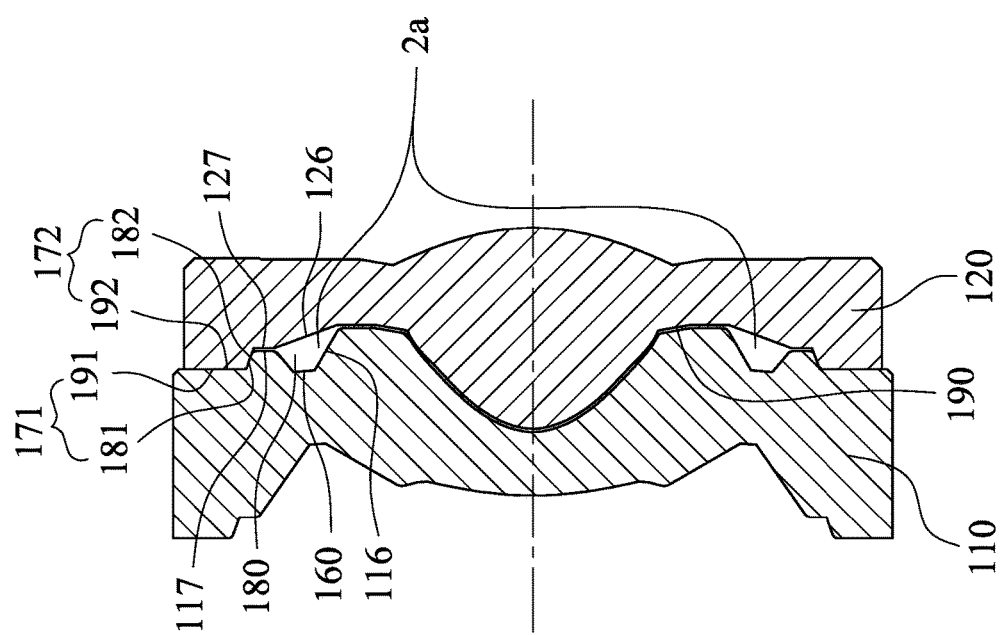
FIG. 1C is a schematic view of a parameter 2a of the plastic optical lens assembly according to the 1st embodiment.
Figure 1D:
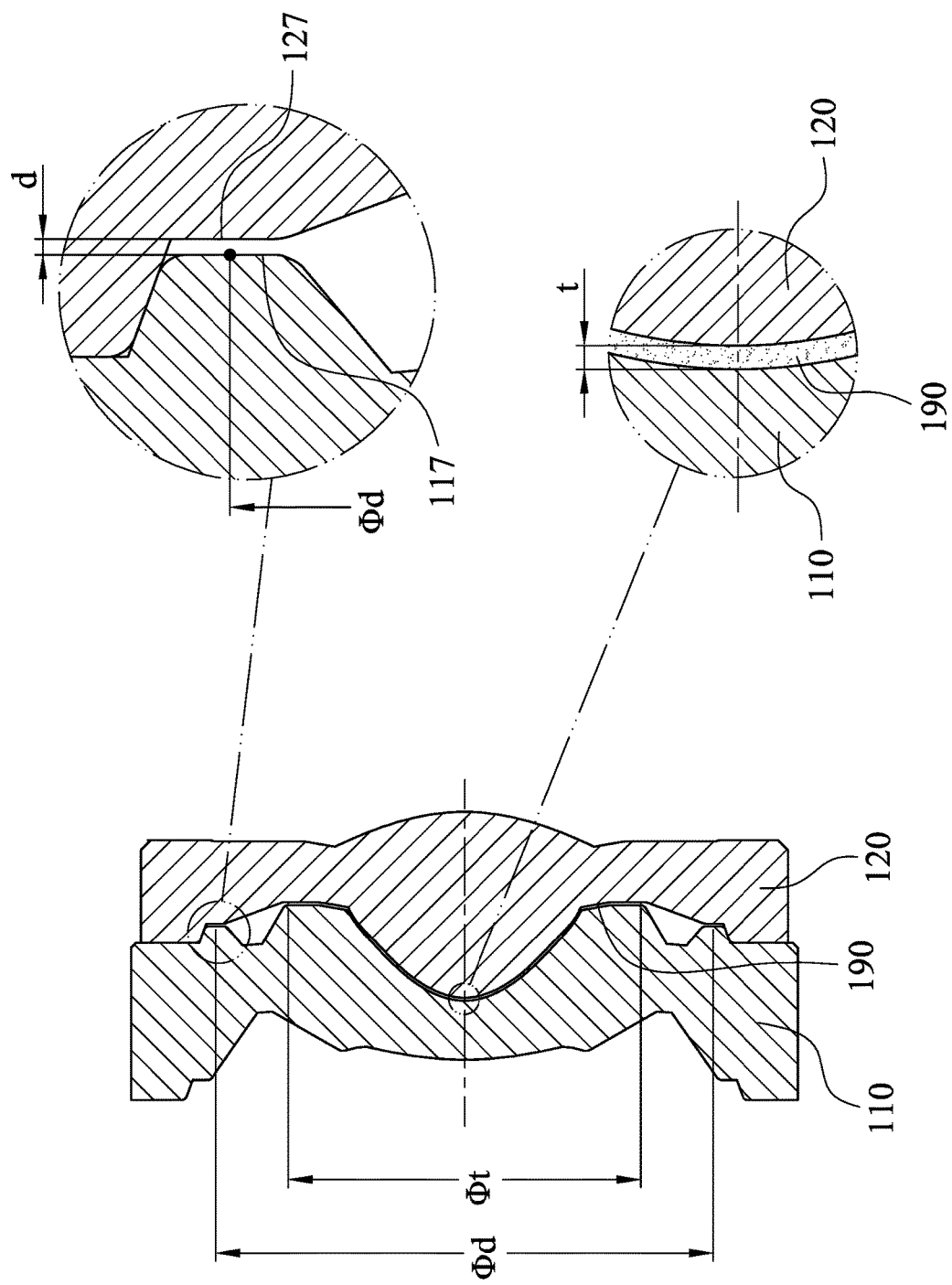
FIG. 1D is a schematic view of parameters φd, φt, d, and t of the plastic optical lens assembly according to the 1st embodiment.

FIG. 1D is a schematic view of parameters $\phi d$, $\phi t$, d, and t of the plastic optical lens assembly 109 according to the 1st embodiment. In FIG. 1D, when a diameter of a width midpoint of one of the first plane section 117 and the second plane section 127 having a narrower width is $\phi d$, and an outer diameter of the cementing glue coating 190 is $\phi t$, the following condition can be satisfied: 0.08 mm<$(\phi d-\phi t)/2$<$\phi t$ mm, wherein the outer diameter of the cementing glue coating 190 is the outer diameter cementing the first lens element 110 and the second lens element 120 without the overflowed part of the cementing glue coating 190 merely attaching one of the first lens element 110 and the second lens element 120. Through the reference gap 188 between the first plane section 117 and the second plane section 127, the application range of the cementing glue coating 190 can be prevented from being overly extended or too small. Preferably, the following condition can be satisfied: 0.16 mm<$\phi d-\phi t$<$\phi t$ mm. Accordingly, the reference gap 188 will not be too far away from the outer diameter of the cementing glue coating 190. In the 1st embodiment, both of the first plane section 117 and the second plane section 127 surround the optical axis and are perpendicular to an annular surface of the optical axis. The one of the first plane section 117 and the second plane section 127 having a shorter annular width is the first plane section 117. A width midpoint of the first plane section 117 forms a circle that regards the optical axis as a center, and the diameter thereof is $\phi d$.

Specifically, in FIG. 1B, during the assembling process of cementing the first lens element 110 and the second lens element 120 with the cementing glue coating 190, the first lens element 110 is firstly placed on a lens platform (not shown) with the first surface 113 facing an upward direction. Next, a non-solid cementing glue 199 whose volume has been estimated is injected as a single drop to the center of the first optical effective portion 114. The second lens element 120 is engaged with the second engaging structure 172 via the first engaging structure 171 with the second surface 123 facing a downward direction, such that the non-solid cementing glue 199 compressed by the first lens element 110 and the second lens element 120 radially spreads to the directions of the first peripheral portion 115 and the second peripheral portion 125 from the center of the first optical effective portion 114 and the center of the second optical effective portion 124. The non-solid cementing glue 199 subsequently hardens to be the cementing glue coating 190 cementing the first lens element 110 and the second lens element 120, such that the first lens element 110 and the second lens element 120 are cemented with each other to form a cemented lens element. Further, via injecting the non-solid cementing glue 199 of the 1st embodiment as a single drop to the center of the first optical effective portion 114, bubbles of the hardened cementing glue coating 190 can be effectively reduced, and the tightness and aligning precision of the cemented lens element can be further enhanced to maintain the image quality of the plastic optical lens assembly 109 better. In other embodiments (not shown), the non-solid cementing glue 199 can be injected between the first surface 113 and the second surface 123 in multiple drops, which is not limited thereto. Moreover, the non-solid cementing glue 199 and the cementing glue coating 190 hardened therefrom are adhesives whose materials are not limited, and the viscosity of the non-solid cementing glue 199 can be adjusted based on the requirement of the structure of the cemented lens element and the assembling process.

In FIG. 1B and FIG. 10, the first engaging structure 171 can include a first conical surface 181 and a first abutting area 191. The first conical surface 181 is a conical annular surface regarding the optical axis as the central line. The first abutting area 191 is perpendicular to the optical axis and is farther away from the first optical effective portion 114 than the first conical surface 181 is thereto. The second engaging structure 172 can include a second conical surface 182 and a second abutting area 192. The second conical surface 182 is a conical annular surface regarding the optical axis as the central line. The second abutting area 192 is perpendicular to the optical axis and is farther away from the second optical effective portion 124 than the second conical surface 182 is thereto. The first conical surface 181 is contacted with the second conical surface 182, and the first abutting area 191 is contacted with the second abutting area 192 to engage the first engaging structure 171 with the second engaging structure 172 for aligning the first optical effective portion 114 with the second optical effective portion 124. Through the way of the first conical surface 181 engaging with the second conical surface 182, the lens elements with the same dimensional tolerance will be assembled easily, the possibility of assembling waste can be effectively reduced, and the manufacturing cost can be further reduced. Furthermore, there are no optical elements between the first conical surface 181 and the second conical surface 182, and the first conical surface 181 is physically contacted with the second conical surface 182; there are no optical elements between the first abutting area 191 and the second abutting area 192, and the first abutting area 191 is physically contacted with the second abutting area 192, such that the offset of the aligning precision can be effectively reduced. Moreover, the first conical surface 181, the second conical surface 182, the first abutting area 191, and the second abutting area 192 can be coated surfaces.

In FIG. 1B, when an angle between the first conical surface 181 and the first abutting area 191 is θ, wherein the parameter θ is ranged between 0 degrees and 180 degrees, the following condition can be satisfied: 90 degrees≤θ≤130 degrees. Accordingly, the distance between the first lens element 110 and the second lens element 120 can be ensured to obtain expected controls to maintain better optical accuracy. Preferably, the following condition can be satisfied: 100 degrees≤θ≤120 degrees. In the 1st embodiment, an angle between the first conical surface 182 and the second abutting area 192 is the same as the parameter θ for aligning the first engaging structure 171 being engaged with the second engaging structure 172, and the first optical effective portion 114 with the second optical effective portion 124.

In FIG. 1A and FIG. 1O, in the 1st embodiment, the first spacing section 116 can include the first plane section 117 which is perpendicular to the optical axis. The second spacing section 126 can include the second plane section 127 which is perpendicular to the optical axis. Further, the reference space 180 can include the reference gap 188. Accordingly, except the first plane section 117 and the second plane section 127 can be a buffer space of the overflowed cementing glue coating 190, the reference gap 188 formed between the first plane section 117 and the second plane section 127 can be a space available for the mechanism between the first lens element 110 and the second lens element 120 to facilitate the design margin of the structure of the cemented lens element.

In FIG. 1B and FIG. 1O, at least one of the first spacing section 116 and the second spacing section 126 can include an annular groove 160 which corresponds to the near surface recess thereof. In other words, the annular groove 160 is included between the first optical effective portion 114 and the first plane section 117 and/or between the second optical effective portion 124 and the second plane section 127. Accordingly, the annular groove 160 can be used as a buffer space of the overflowed cementing glue coating 190 to receive the cementing glue coating 190 overflowed from the first optical effective portion 114 and the second optical effective portion 124 and to further prevent the cementing glue coating 190 from overflowing to the first conical surface 181 and the second conical surface 182 to affect the aligning precision of assembling the cemented lens element. In the 1st embodiment, the first spacing section 116 includes the annular groove 160. In other embodiments (not shown), the second spacing section can include an annular groove, or both of the first spacing section and the second spacing section can include an annular groove.

When a roughness of the annular groove 160 is Ra, the following condition can be satisfied: 0.1 μm<Ra<4.0 μm. Accordingly, the efficiency for absorbing the redundant non-solid cementing glue 199 can be enhanced while reducing the stray light reflection as well.

The first plane section 117 can be connected with the first conical surface 181, and the first conical surface 181 can be connected with the first abutting area 191. That is, only one conical surface is between the first plane section 117 and the first abutting area 191, and no other conical surfaces are continuously connected therebetween. Accordingly, the structural complexity of the cemented lens element can be reduced, and the dimensional accuracy of the structure of the cemented lens element can be enhanced. In the 1st embodiment, the first plane section 117 is connected with the first conical surface 181, and the first conical surface 181 is connected with the first abutting area 191. The second plane section 127 is connected with the second conical surface 182, and the second conical surface 182 is connected with the second abutting area 192.

In FIG. 1A and FIG. 1C, both of the first plane section 117 and the second plane section 127 can have no contact with the cementing glue coating 190. Accordingly, the reference gap 188 formed between the first plane section 117 and the second plane section 127 can be used as a space available for the mechanism between the first lens element 110 and the second lens element 120 for further preventing the cementing glue coating 190 from overflowing to the first conical surface 181 and the second conical surface 182 to affect the aligning precision of assembling the cemented lens element. In the 1st embodiment, both of the first plane section 117 and the second plane section 127 have no contact with the cementing glue coating 190.

In FIG. 1D, both of the first plane section 117 and the second plane section 127 are perpendicular to the optical axis, and hence the first plane section 117 and the second plane section 127 are parallel to each other. When a distance between the first plane section 117 and the second plane section 127 is d, i.e., the gap width of the reference gap 188, the following condition can be satisfied: 0.002 mm<d<0.06 mm. Accordingly, the accuracy of the reference gap 188 between the first plane section 117 and the second plane section 127 can be enhanced while preventing the tolerance from being too large to ensure the compatibility of the optical elements (e.g., light blocking sheets) within the reference gap 188, and the optical quality of the plastic optical lens assembly 109 can be prevented from being affected by the overly shaken optical elements within the reference gap 188.

When the distance between the first plane section 117 and the second plane section 127 is d, and a thickness of the cementing glue coating 190 on the optical axis is t, the following condition can be satisfied: 0.25<d/t<4.0. Accordingly, the parameters d and t being closer to each other facilitate to stably control the usage of the non-solid cementing glue 199 to consistently maintain the distances between the first lens element 112 and the second lens element 120 before and after cementing the first lens element 110 and the second lens element 120. Preferably, the following condition can be satisfied: 0.40<d/t<3.0.

In FIG. 1O, an area on a cross section where the reference space 180 is coplanar with the optical axis is 2a, wherein there are two separate areas on the cross section where the reference space 180 is coplanar with the optical axis, and the total area thereof is 2a. Thus, when an average area of each of the areas is a, the following condition can be satisfied: 0.02 mm$^2$<2a<0.6 mm$^2$. By the reference space 180, the phenomenon of the non-solid cementing glue 199 overflowing for the capillary effect can be reduced, and the plastic optical lens assembly 109 can be maintained miniaturized.

Please refer to the following Table 1, which lists the data defined based on the aforementioned parameters of the plastic optical lens assembly 109 of the imaging lens module 100 of the 1st embodiment as illustrated in FIG. 1B to FIG. 1D.

TABLE 1

| 1st embodiment | | | |
|---|---|---|---|
| φd (mm) | 5.07 | Ra (μm) | 0.4-0.56 |
| φt (mm) | 3.59 | d (mm) | 0.027 |
| (φd − φt)/2 (mm) | 0.740 | t (mm) | 0.03 |
| φd − φt (mm) | 1.480 | d/t | 0.900 |
| θ (degrees) | 110 | 2a (mm$^2$) | 0.2884 |

2nd Embodiment

Figure 2A:
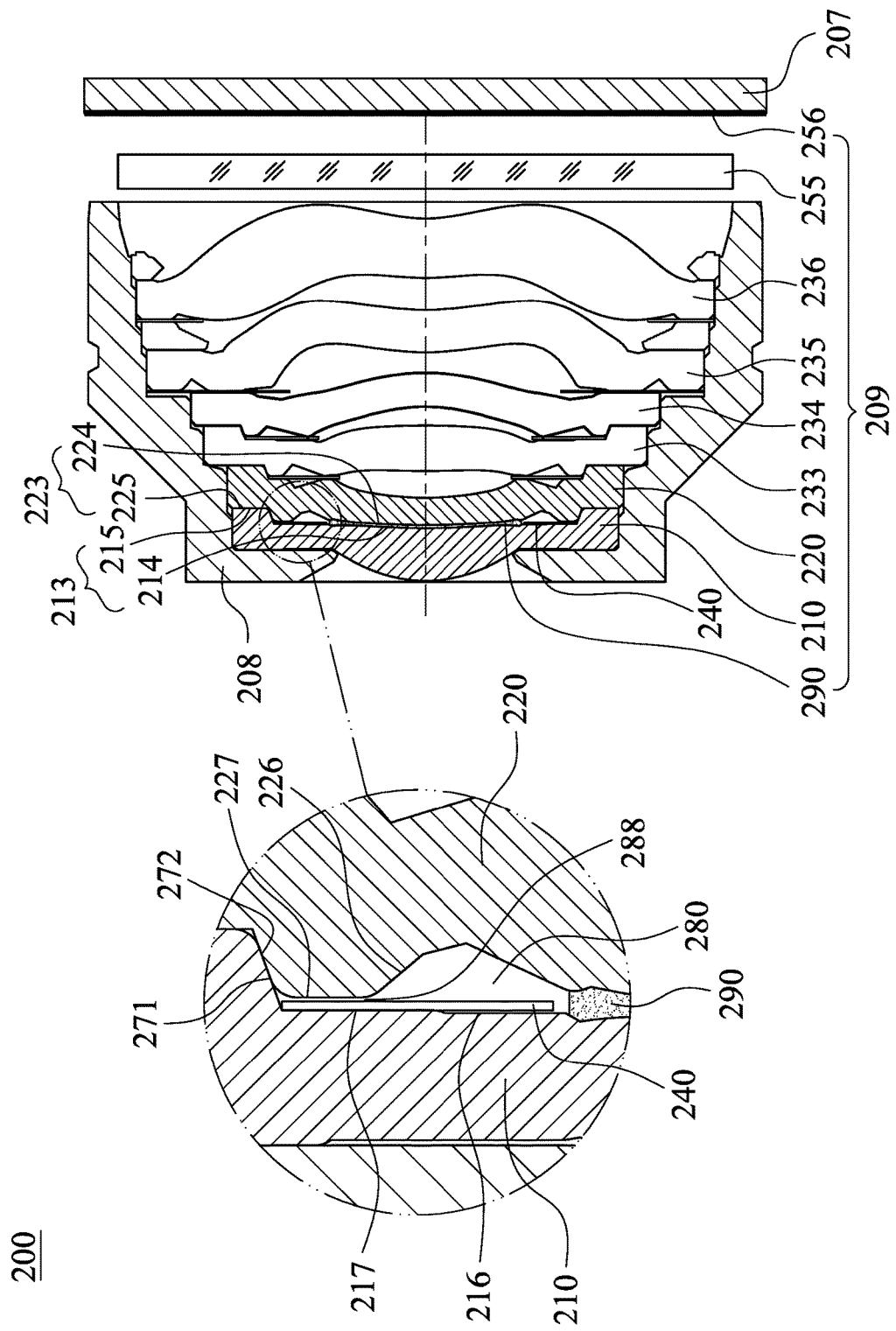
FIG. 2A is a schematic view of an imaging lens module according to the 2nd embodiment of the present disclosure.

FIG. 2A is a schematic view of an imaging lens module 200 according to the 2nd embodiment of the present disclosure. In FIG. 2A, the imaging lens module 200 includes a plastic optical lens assembly 209 and an image sensor 207, wherein the plastic optical lens assembly 209 includes a first lens element 210, a second lens element 220, and a cementing glue coating 290. The image sensor 207 is disposed on an image surface 256 of the plastic optical lens assembly 209.

In the 2nd embodiment, the plastic optical lens assembly 209 includes, in order from an object side to an image side, the first lens element 210, the second lens element 220, lens elements 233, 234, 235, 236, a glass panel 255, and the image surface 256, wherein the plastic optical lens assembly 209 has 6 lens elements (i.e., the first lens element 210, the second lens element 220, the lens elements 233, 234, 235, 236), and all of the six lens elements are plastic materials. The cementing glue coating 290 cements the first lens element 210 and the second lens element 220, and all of the first lens element 210, the second lens element 220, the lens elements 233, 234, 235, and 236 are disposed inside the plastic barrel 208 along an optical axis of the plastic optical lens assembly 209. In addition, the glass panel 255 can be a cover glass element, a filter, or both, and will not affect the focal length of the plastic optical lens assembly 209.

Figure 2B:
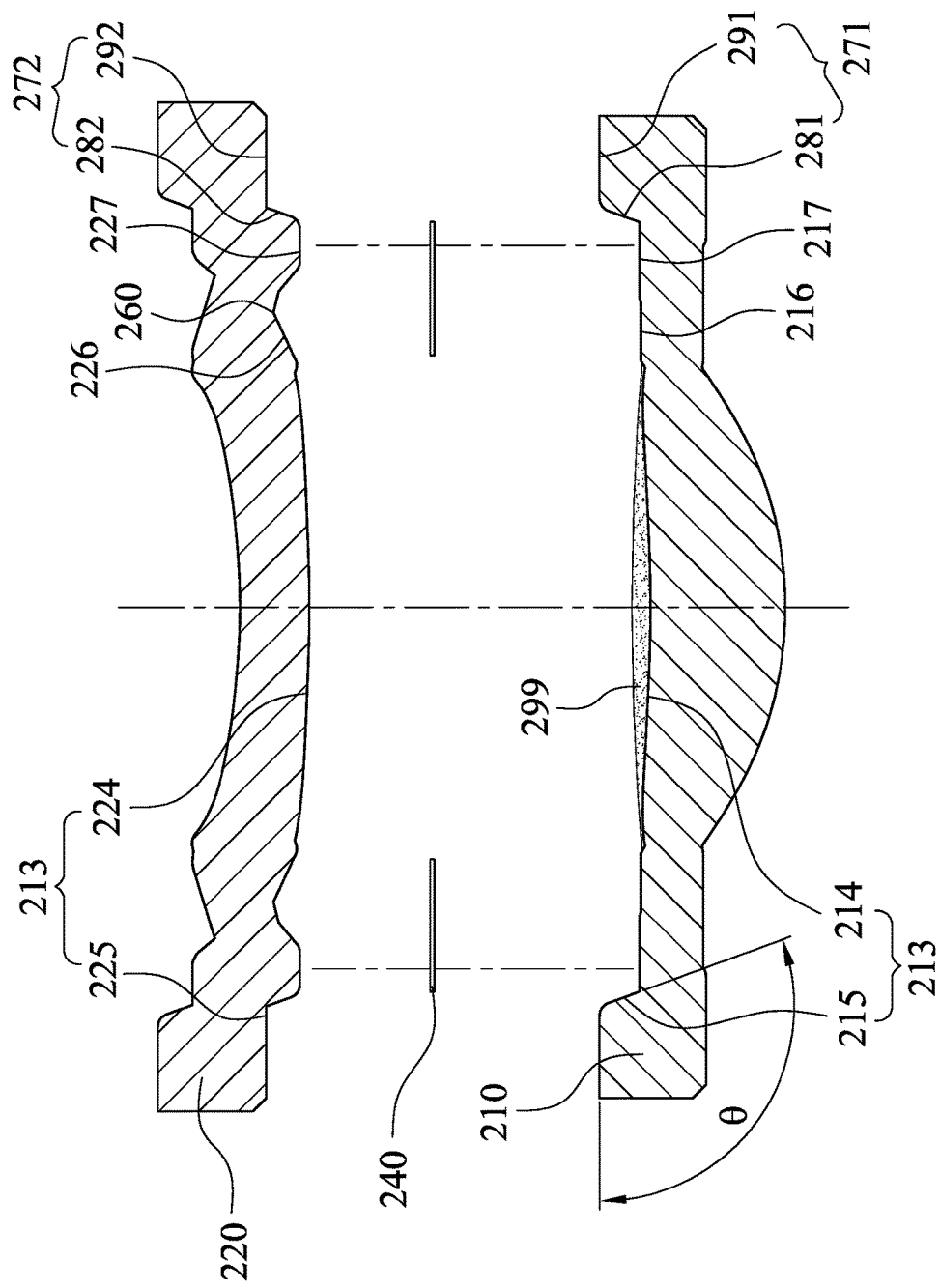
FIG. 2B is a schematic view of assembling the first lens element and the second lens element according to the 2nd embodiment.

FIG. 2B is a schematic view of assembling the first lens element 210 and the second lens element 220 according to the 2nd embodiment. In FIG. 2A and FIG. 2B, the first lens element 210 includes a first surface 213. The first surface 213 includes a first optical effective portion 214 and a first peripheral portion 215, wherein the first peripheral portion 215 surrounds the first optical effective portion 214. The second lens element 220 includes a second surface 223. The second surface 223 includes a second optical effective portion 224 and a second peripheral portion 225, wherein the second optical effective portion 224 is disposed correspondingly to the first optical effective portion 214, and the second peripheral portion 225 surrounds the second optical effective portion 224. In the 2nd embodiment, the first surface 213 is the surface of the first lens element 210 facing the image surface 256, and the first optical effective portion 214 is concave in a paraxial region thereof. The second surface 223 is the surface of the second lens element 220 facing an imaged object (not shown), and the second optical effective portion 224 is a convex in a paraxial region thereof.

Figure 2C:
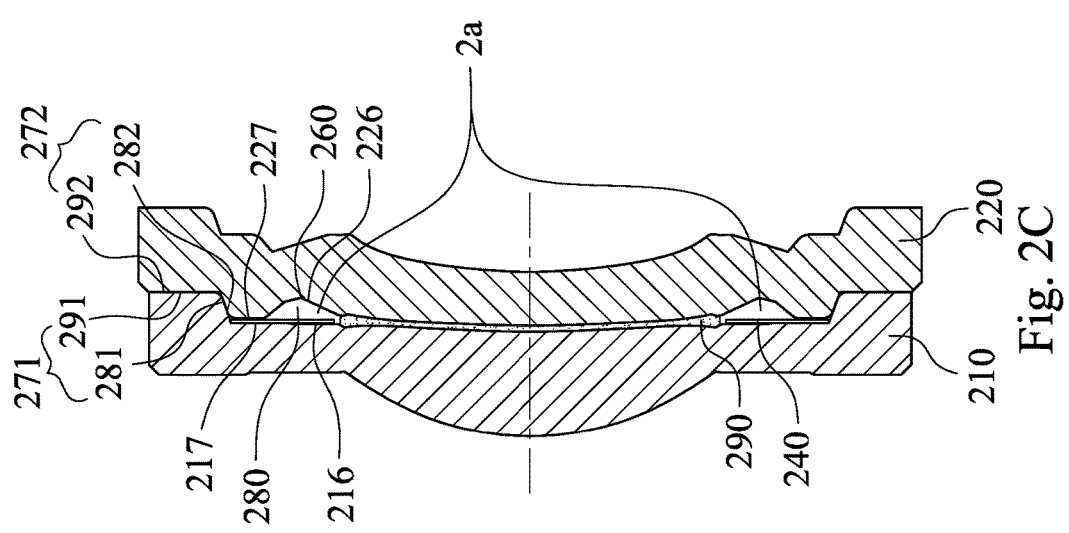
FIG. 2C is a schematic view of a parameter 2a of the plastic optical lens assembly according to the 2nd embodiment.

FIG. 2C is a schematic view of a parameter 2a of the plastic optical lens assembly 209 according to the 2nd embodiment. In FIG. 2A and FIG. 2C, the cementing glue coating 290 is disposed between the first optical effective portion 214 and the second optical effective portion 224, and the cementing glue coating 290 cements the first lens element 210 and the second lens element 220. That is, the first lens element 210 and the second lens element 220 are cemented to form a cemented lens element via cementing the first optical effective portion 214 and the second optical effective portion 224.

Specifically, in FIG. 2A and FIG. 2B, the first peripheral portion 215 includes a first spacing section 216 and a first engaging structure 271. The first spacing section 216 is located between the first optical effective portion 214 and the first engaging structure 271. The second peripheral portion 225 includes a second spacing section 226 and a second engaging structure 272. The second spacing section 226 is located between the second optical effective portion 224 and the second engaging structure 272, wherein the first engaging structure 271 is engaged with the second engaging structure 272 for aligning the first optical effective portion 214 with the second optical effective portion 224, and a reference space 280 is formed between the first spacing section 216 and the second spacing section 226, wherein the reference space 280 is an air gap between the first spacing section 216 and the second spacing section 226.

In other words, the first peripheral portion 215 includes the first plane section 217 and the first engaging structure 271. The first plane section 217 is perpendicular to the optical axis of the plastic optical lens assembly 209 and is located between the first optical effective portion 214 and the first engaging structure 271. The second peripheral portion 225 includes the second plane section 227 and the second engaging structure 272. The second plane section 227 is perpendicular to the optical axis and is located between the second optical effective portion 224 and the second engaging structure 272, wherein the first engaging structure 271 is engaged with the second engaging structure 272 for aligning the first optical effective portion 214 with the second optical effective portion 224, and a reference gap 288 is formed between the first plane section 217 and the second plane section 227, wherein the reference gap 288 is an air gap between the first plane section 217 and the second plane section 227.

Figure 2D:
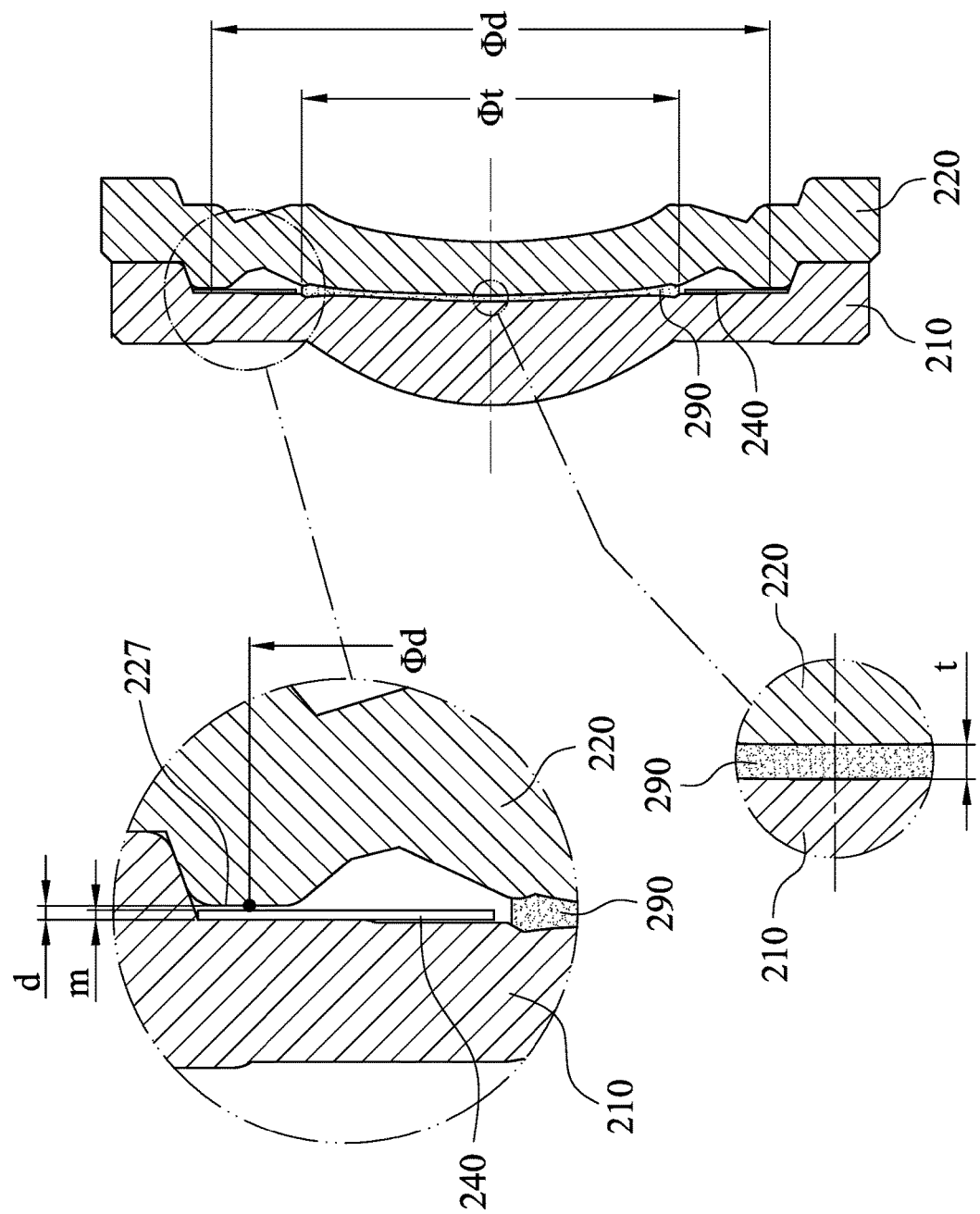
FIG. 2D is a schematic view of parameters φd, φt, d, t, and m of the plastic optical lens assembly according to the 2nd embodiment.

FIG. 2D is a schematic view of parameters φd, φt, d, t, and m of the plastic optical lens assembly 209 according to the 2nd embodiment. In FIG. 2D, both of the first plane section 217 and the second plane section 227 surround the optical axis and are perpendicular to the annular surface of the optical axis. The one of the first plane section 217 and the second plane section 227 with shorter annular width is the second plane section 227. A width midpoint of the second plane section 227 forms a circle that regards the optical axis as a center, and the diameter thereof is 1d.

Specifically, in FIG. 2B, during the assembling process of cementing the first lens element 210 and the second lens element 220 with the cementing glue coating 290, the first lens element 210 is firstly placed on a lens platform (not shown) with the first surface 213 facing an upward direction. Next, a non-solid cementing glue 299 whose volume has been estimated is injected as a single drop to the center of the first optical effective portion 214. The second lens element 220 is engaged with the second engaging structure 272 via the first engaging structure 271 with the second surface 223 facing a downward direction, and a light blocking sheet 240 is assembled between the first surface 213 and the second surface 223, such that the non-solid cementing glue 299 compressed by the first lens element 210 and the second lens element 220 radially spreads to the directions of the first peripheral portion 215 and the second peripheral portion 225 from the center of the first optical effective portion 214 and the center of the second optical effective portion 224. The non-solid cementing glue 299 subsequently hardens to be the cementing glue coating 290 cementing the first lens element 210 and the second lens element 220, such that the first lens element 210 and the second lens element 220 are cemented with each other to form a cemented lens element.

In FIG. 2B and FIG. 2C, the first engaging structure 271 includes a first conical surface 281 and a first abutting area 291. The first conical surface 281 is a conical annular surface regarding the optical axis as the central line. The first abutting area 291 is perpendicular to the optical axis and is farther away from the first optical effective portion 214 than the first conical surface 281 is thereto. The second engaging structure 272 includes a second conical surface 282 and a second abutting area 292. The second conical surface 282 is a conical annular surface regarding the optical axis as the central line. The second abutting area 292 is perpendicular to the optical axis and is farther away from the second optical effective portion 224 than the second conical surface 282 is thereto. The first conical surface 281 is contacted with the second conical surface 282, and the first abutting area 291 is contacted with the second abutting area 292 to engage the first engaging structure 271 with the second engaging structure 272 for aligning the first optical effective portion 214 with the second optical effective portion 224.

In FIG. 2A and FIG. 2C, the first spacing section 216 includes the first plane section 217 which is perpendicular to the optical axis. The second spacing section 226 includes the second plane section 227 which is perpendicular to the optical axis. Both of the first plane section 217 and the second plane section 227 have no contact with the cementing glue coating 290. Further, the reference space 280 can include the reference gap 288.

In FIG. 2B and FIG. 2C, the second spacing section 226 includes an annular groove 260 which corresponds to the near surface recess thereof. In other words, the annular groove 260 is included between the second optical effective portion 224 and the second plane section 227.

The first plane section 217 is connected with the first conical surface 281, and the first conical surface 281 is connected with the first abutting area 291. Meanwhile, the second plane section 227 is connected with the second conical surface 282, and the second conical surface 282 is connected with the second abutting area 292.

In FIG. 2A, the plastic optical lens assembly 209 further includes a light blocking sheet 240 which is disposed between the first plane section 217 and the second plane section 227, or it can be said that the light blocking sheet 240 is disposed in the reference gap 288. In one time, one of the first plane section 217 and the second plane section 227 receives the light blocking sheet 240, i.e., the distance d (a gap width of the reference gap 288) between the first plane section 217 and the second plane section 227 is larger than the thickness of the light blocking sheet 240. Therefore, the light blocking sheet 240 is loosely disposed in the reference gap 288, rather than the first plane section 217 and the second plane section 227 being simultaneously against the light blocking sheet 240 tightly. Hence, by placing the light blocking sheet 240 in the reference gap 288 between the first plane section 217 and the second plane section 227, the light blocking sheet 240 can have a great configuration status in the cemented lens element to promote the light blocking efficiency of the plastic optical lens assembly 209 and the image quality of the imaging lens module 200. Additionally, the dimension of the light blocking sheet 240 can be adjusted to extend to the reference space 280 beyond the reference gap 288 based on the optical specification requirement.

In FIG. 2D, when the distance between the first plane section 217 and the second plane section 227 is d and the thickness of the light blocking sheet 240 is m, the following condition can be satisfied: 0.002 mm<d−m<0.015 mm. Accordingly, in the precision range of the parameters d and m, the light blocking sheet 240 can be prevented from being overly shaken and compressed by the first plane section 217 and the second plane section 227, which facilitates to maintain the optical quality of the plastic optical lens assembly 209.

Please refer to the following Table 2, which lists the data defined based on the aforementioned parameters $\phi d$, $\phi t$, $(\phi d-\phi t)/2$, $\phi d-\phi t$, $\theta$, Ra, d, t, d/t, m, d−m, and $2a$ (whose definitions are the same as those of the plastic optical lens assembly 109 of the imaging lens module 100 of the 1st embodiment) of the plastic optical lens assembly 209 of the imaging lens module 200 of the 2nd embodiment as illustrated in FIG. 2B to FIG. 2D.

TABLE 2

| 2nd embodiment | | | |
|---|---|---|---|
| $\phi d$ (mm) | 2.73 | d (mm) | 0.024 |
| $\phi t$ (mm) | 1.84 | t (mm) | 0.03 |
| $(\phi d - \phi t)/2$ (mm) | 0.445 | d/t | 0.800 |
| $\phi d - \phi t$ (mm) | 0.890 | m (mm) | 0.016 |
| $\theta$ (degrees) | 110 | d − m (mm) | 0.008 |
| Ra (µm) | 1.12-1.6 | 2a (mm$^2$) | 0.0714 |

3rd Embodiment

Figure 3A:
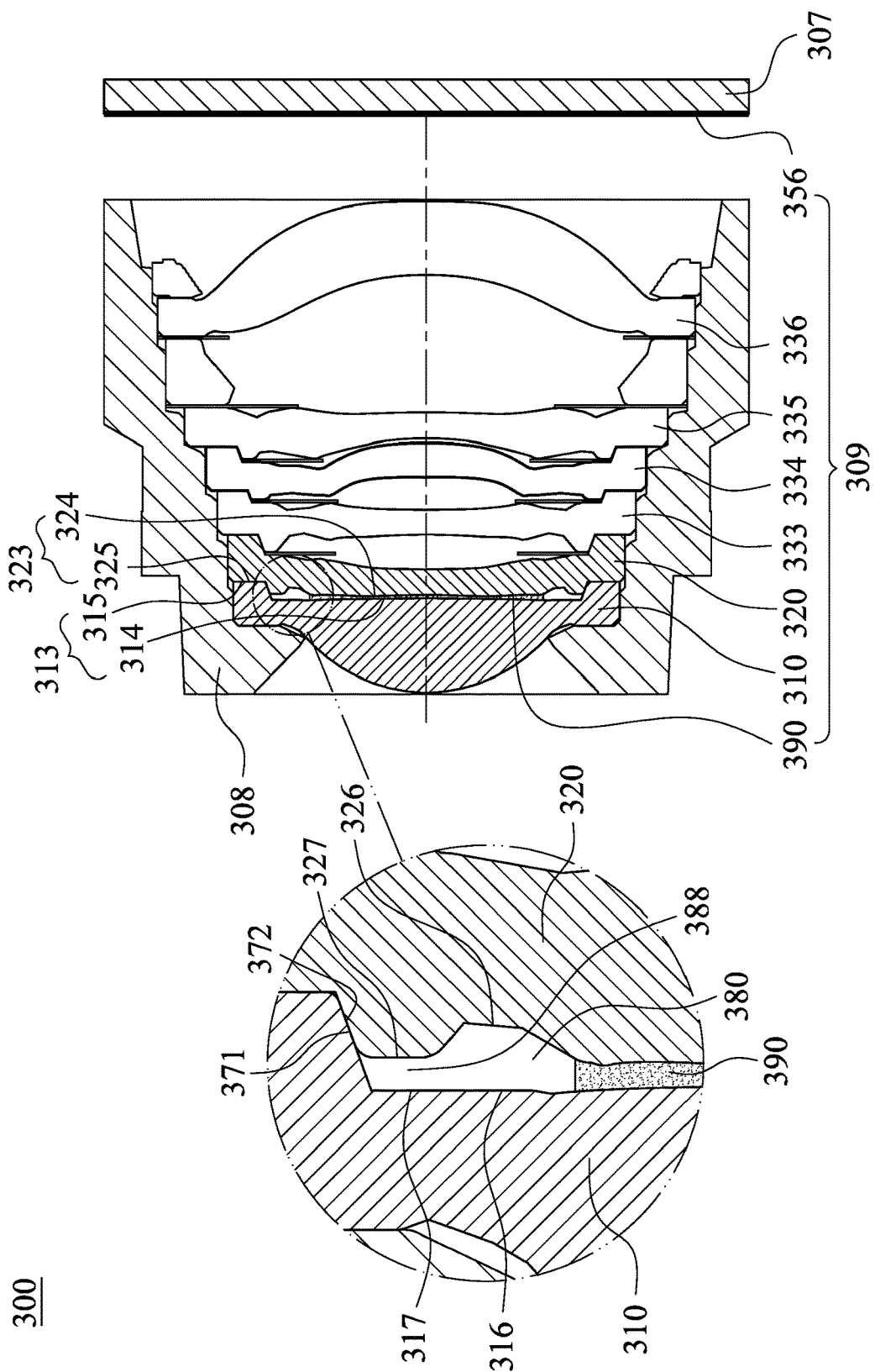
FIG. 3A is a schematic view of an imaging lens module according to the 3rd embodiment of the present disclosure.

FIG. 3A is a schematic view of an imaging lens module 300 according to the 3rd embodiment of the present disclosure. In FIG. 3A, the imaging lens module 300 includes a plastic optical lens assembly 309 and an image sensor 307, wherein the plastic optical lens assembly 309 includes a first lens element 310, a second lens element 320, and a cementing glue coating 390. The image sensor 307 is disposed on an image surface 356 of the plastic optical lens assembly 309.

In the 3rd embodiment, the plastic optical lens assembly 309 includes, in order from an object side to an image side, the first lens element 310, the second lens element 320, lens elements 333, 334, 335, 336, and the image surface 356, wherein the plastic optical lens assembly 309 has six lens elements (i.e., the first lens element 310, the second lens element 320, the lens elements 333, 334, 335, 336), and all of the six lens elements are plastic materials. The cementing glue coating 390 cements the first lens element 310 and the second lens element 320, and all of the first lens element 310, the second lens element 320, the lens elements 333, 334, 335, and 336 are disposed inside the plastic barrel 308 along an optical axis of the plastic optical lens assembly 309.

Figure 3B:
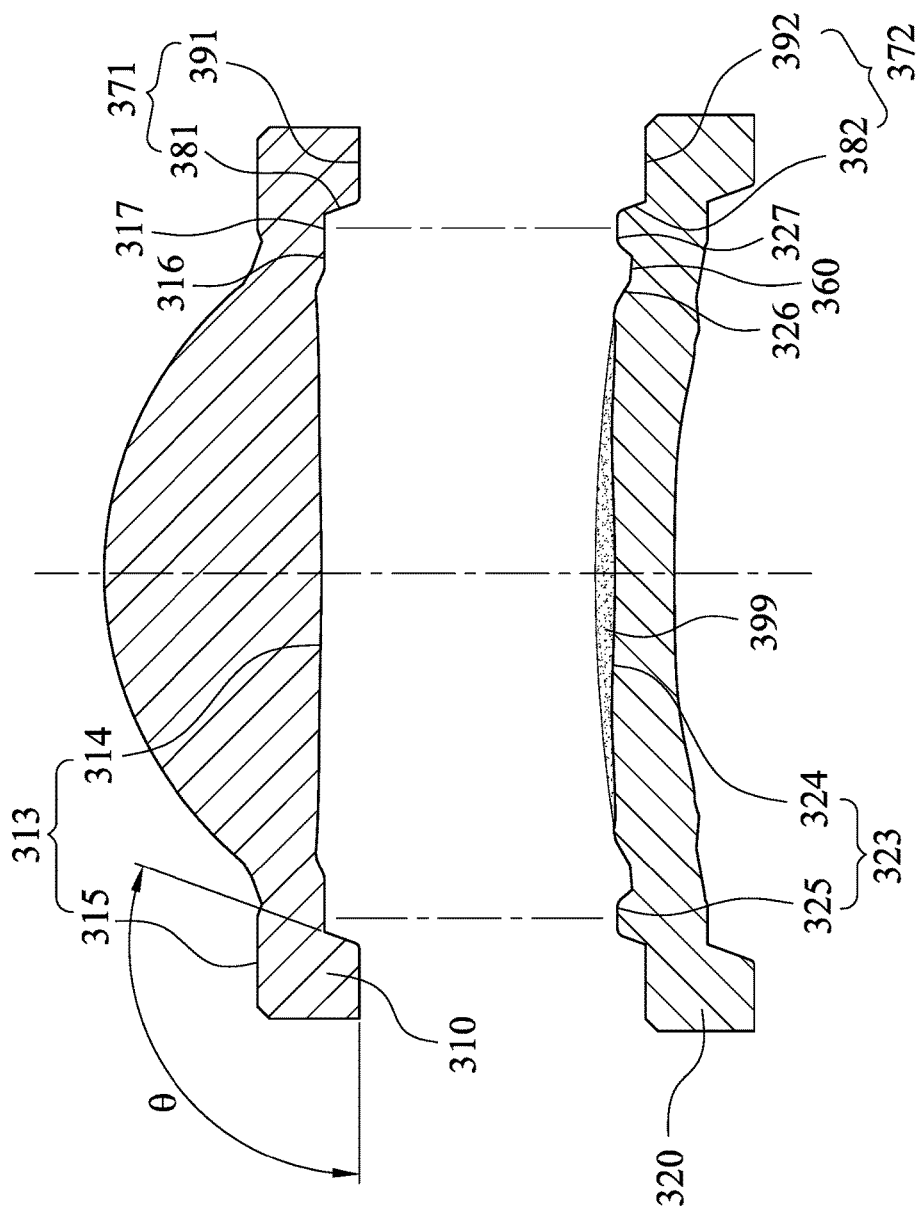
FIG. 3B is a schematic view of assembling the first lens element and the second lens element according to the 3rd embodiment.

FIG. 3B is a schematic view of assembling the first lens element 310 and the second lens element 320 according to the 3rd embodiment. In FIG. 3A and FIG. 3B, the first lens element 310 includes a first surface 313. The first surface 313 includes a first optical effective portion 314 and a first peripheral portion 315, wherein the first peripheral portion 315 surrounds the first optical effective portion 314. The second lens element 320 includes a second surface 323. The second surface 323 includes a second optical effective portion 324 and a second peripheral portion 325, wherein the second optical effective portion 324 is disposed correspondingly to the first optical effective portion 314, and the second peripheral portion 325 surrounds the second optical effective portion 324. In the 3rd embodiment, the first surface 313 is the surface of the first lens element 310 facing the image surface 356, and the first optical effective portion 314 convex in a paraxial region thereof. The second surface 323 is the surface of the second lens element 320 facing an imaged object (not shown), and the second optical effective portion 324 is concave in a paraxial region thereof.

Figure 3C:
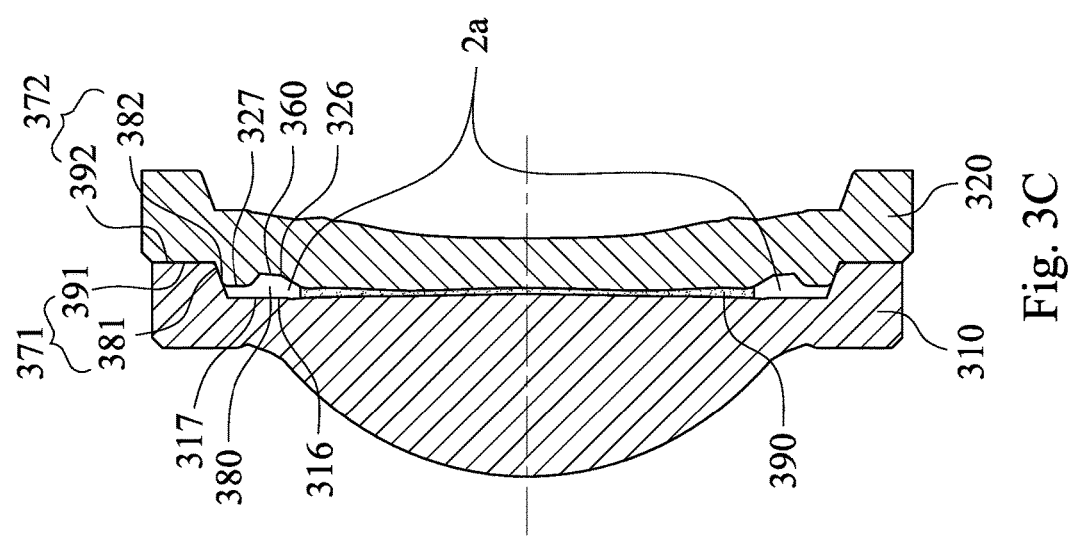
FIG. 3C is a schematic view of a parameter 2a of the plastic optical lens assembly according to the 3rd embodiment.

FIG. 3C is a schematic view of a parameter 2a of the plastic optical lens assembly 309 according to the 3rd embodiment. In FIG. 3A and FIG. 3C, the cementing glue coating 390 is disposed between the first optical effective portion 314 and the second optical effective portion 324, and the cementing glue coating 390 cements the first lens element 310 and the second lens element 320. That is, the first lens element 310 and the second lens element 320 are cemented to form a cemented lens element via cementing the first optical effective portion 314 and the second optical effective portion 324.

Specifically, in FIG. 3A and FIG. 3B, the first peripheral portion 315 includes a first spacing section 316 and a first engaging structure 371. The first spacing section 316 is located between the first optical effective portion 314 and the first engaging structure 371. The second peripheral portion 325 includes a second spacing section 326 and a second engaging structure 372. The second spacing section 326 is located between the second optical effective portion 324 and the second engaging structure 372, wherein the first engaging structure 371 is engaged with the second engaging structure 372 for aligning the first optical effective portion 314 with the second optical effective portion 324, and a reference space 380 is formed between the first spacing section 316 and the second spacing section 326, wherein the reference space 380 is an air gap between the first spacing section 316 and the second spacing section 326.

In other words, the first peripheral portion 315 includes the first plane section 317 and the first engaging structure 371. The first plane section 317 is perpendicular to the optical axis of the plastic optical lens assembly 309 and is located between the first optical effective portion 314 and the first engaging structure 371. The second peripheral portion 325 includes the second plane section 327 and the second engaging structure 372. The second plane section 327 is perpendicular to the optical axis and is located between the second optical effective portion 324 and the second engaging structure 372, wherein the first engaging structure 371 is engaged with the second engaging structure 372 for aligning the first optical effective portion 314 with the second optical effective portion 324, and a reference gap 388 is formed between the first plane section 317 and the second plane section 327, wherein the reference gap 388 is an air gap between the first plane section 317 and the second plane section 327.

Figure 3D:
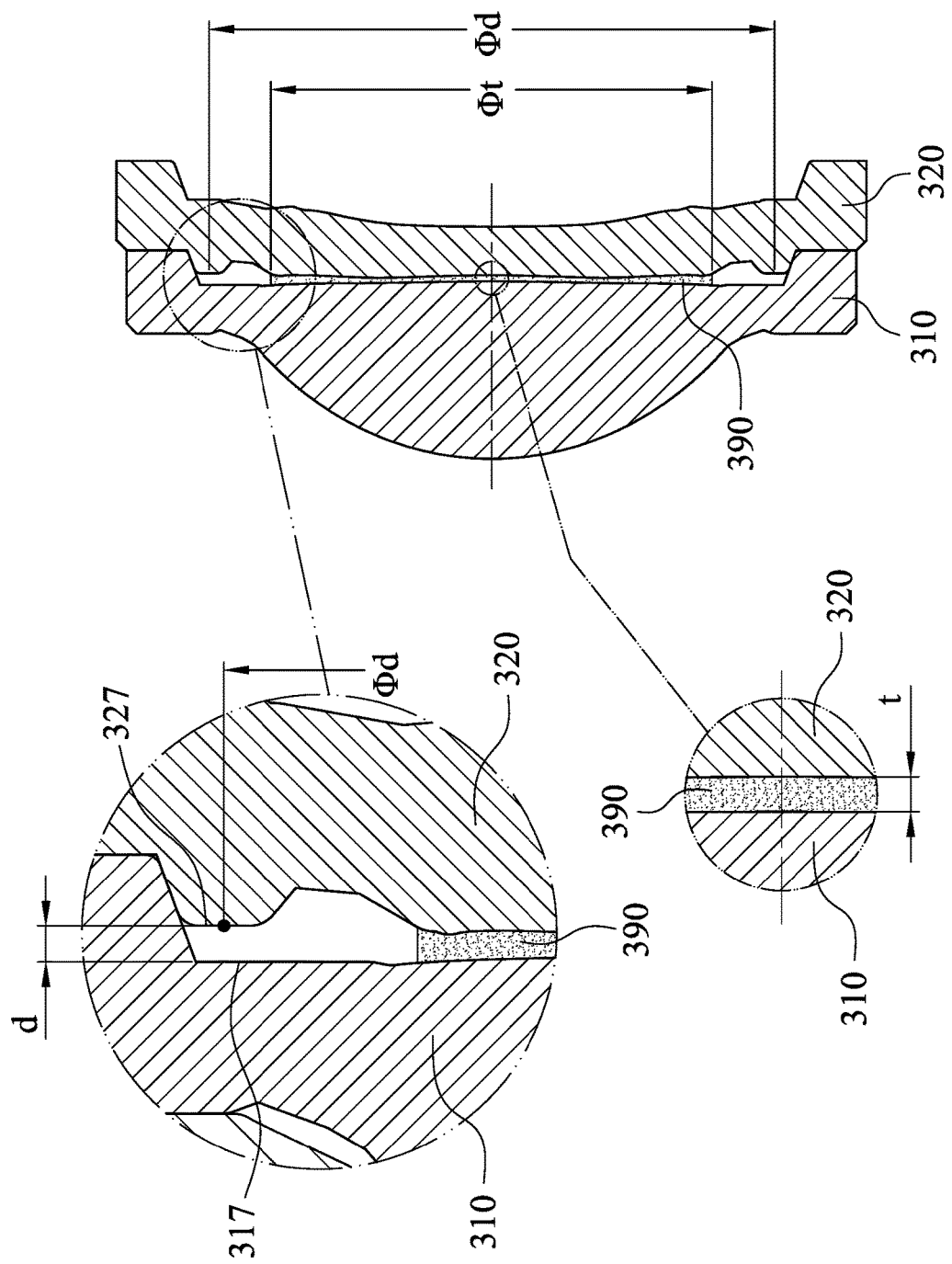
FIG. 3D is a schematic view of parameters φd, φt, d, and t of the plastic optical lens assembly according to the 3rd embodiment.

FIG. 3D is a schematic view of parameters $\phi d$, $\phi t$, d, and t of the plastic optical lens assembly 309 according to the 3rd embodiment. In FIG. 3D, both of the first plane section 317 and the second plane section 327 surround the optical axis and are perpendicular to the annular surface of the optical axis. The one of the first plane section 317 and the second plane section 327 with shorter annular width is the second plane section 327. A width midpoint of the second plane section 327 forms a circle that regards the optical axis as a center, and the diameter thereof is $\phi d$.

Specifically, in FIG. 3B, during the assembling process of cementing the first lens element 310 and the second lens element 320 with the cementing glue coating 390, the second lens element 320 is firstly placed on a lens platform (not shown) with the second surface 323 facing an upward direction. Next, a non-solid cementing glue 399 whose volume has been estimated is injected as a single drop to the center of the second optical effective portion 324. The first lens element 310 is engaged with the second engaging structure 372 via the first engaging structure 371 with the first surface 313 facing a downward direction, such that the non-solid cementing glue 399 compressed by the first lens element 310 and the second lens element 320 radially spreads to the directions of the first peripheral portion 315 and the second peripheral portion 325 from the center of the first optical effective portion 314 and the center of the second optical effective portion 324. The non-solid cementing glue 399 subsequently hardens to be the cementing glue coating 390 cementing the first lens element 310 and the second lens element 320, such that the first lens element 310 and the second lens element 320 are cemented with each other to form a cemented lens element.

In FIG. 3B and FIG. 3C, the first engaging structure 371 includes a first conical surface 381 and a first abutting area 391. The first conical surface 381 is a conical annular surface regarding the optical axis as the central line. The first abutting area 391 is perpendicular to the optical axis and is farther away from the first optical effective portion 314 than the first conical surface 381 is thereto. The second engaging structure 372 includes a second conical surface 382 and a second abutting area 392. The second conical surface 382 is a conical annular surface regarding the optical axis as the central line. The second abutting area 392 is perpendicular to the optical axis and is farther away from the second optical effective portion 324 than the second conical surface 382 is thereto. The first conical surface 381 is contacted with the second conical surface 382, and the first abutting area 391 is contacted with the second abutting area 392 to engage the first engaging structure 371 with the second engaging structure 372 for aligning the first optical effective portion 314 with the second optical effective portion 324.

In FIG. 3A and FIG. 3C, the first spacing section 316 includes the first plane section 317 which is perpendicular to the optical axis. The second spacing section 326 includes the second plane section 327 which is perpendicular to the optical axis. Both of the first plane section 317 and the second plane section 327 have no contact with the cementing glue coating 390. Further, the reference space 380 includes the reference gap 388.

In FIG. 3B and FIG. 3C, the second spacing section 326 includes an annular groove 360 which corresponds to the near surface recess thereof. In other words, the annular groove 360 is included between the second optical effective portion 324 and the second plane section 327.

The first plane section 317 is connected with the first conical surface 381, and the first conical surface 381 is connected with the first abutting area 391. Meanwhile, the second plane section 327 is connected with the second conical surface 382, and the second conical surface 382 is connected with the second abutting area 392.

Please refer to the following Table 3, which lists the data defined based on the aforementioned parameters $\phi d$, $\phi t$, ($\phi d - \phi t$)/2, $\phi d - \phi t$, $\theta$, Ra, d, t, d/t, and 2a (whose definitions are the same as those of the plastic optical lens assembly 109 of the imaging lens module 100 of the 1st embodiment) of the plastic optical lens assembly 309 of the imaging lens module 300 of the 3rd embodiment as illustrated in FIG. 3B to FIG. 3D.

TABLE 3

3rd embodiment

| φd (mm) | 2.79 | Ra (μm) | 0.4-0.8 |
|---|---|---|---|
| φt (mm) | 2.18 | d (mm) | 0.057 |
| (φd – φt)/2 (mm) | 0.305 | t (mm) | 0.03 |
| φd – φt (mm) | 0.610 | d/t | 1.900 |
| θ (degrees) | 110 | 2a (mm²) | 0.0606 |

4th Embodiment

Figure 4A:
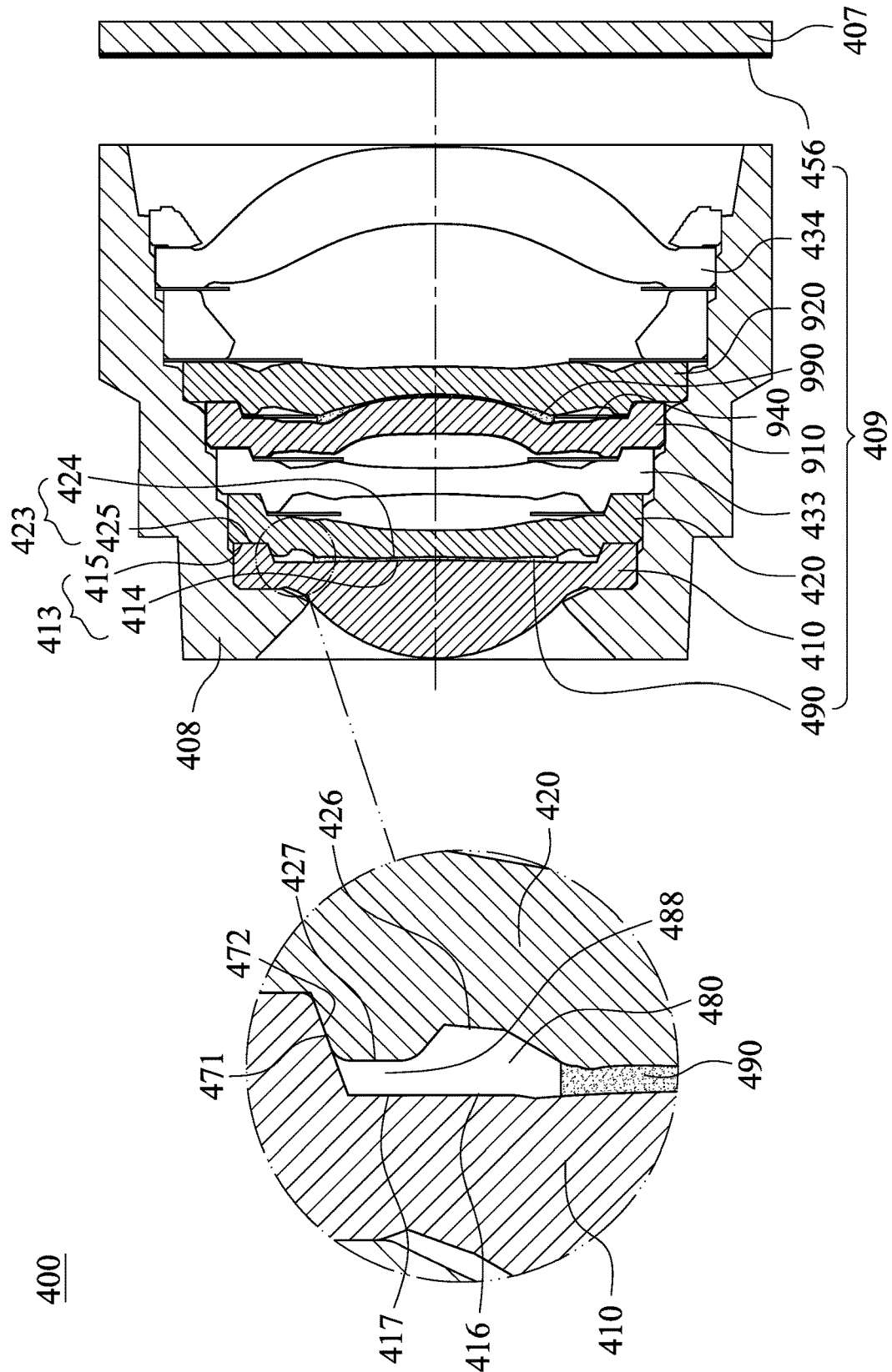
FIG. 4A is a schematic view of an imaging lens module according to the 4th embodiment of the present disclosure.

FIG. 4A is a schematic view of an imaging lens module 400 according to the 4th embodiment of the present disclosure. In FIG. 4A, the imaging lens module 400 includes a plastic optical lens assembly 409 and an image sensor 407, wherein the plastic optical lens assembly 409 includes a first lens element 410, a second lens element 420, a cementing glue coating 490, a first lens element 910, a second lens element 920, and a cementing glue coating 990. The image sensor 407 is disposed on an image surface 456 of the plastic optical lens assembly 409.

In the 4th embodiment, the plastic optical lens assembly 409 includes, in order from an object side to an image side, the first lens element 410, the second lens element 420, a lens element 433, the first lens element 910, the second lens element 920, a lens element 434, and the image surface 456, wherein the plastic optical lens assembly 409 has six lens elements (i.e., the first lens element 410, the second lens element 420, the lens element 433, the first lens element 910, the second lens element 920, and the lens element 434), and all of the 6 lens elements are plastic materials. The cementing glue coating 490 cements the first lens element 410 and the second lens element 420, the cementing glue coating 990 cements the first lens element 910 and the second lens element 920, and all of the first lens element 410, the second lens element 420, the lens element 433, the first lens element 910, the second lens element 920, and the lens element 434 are disposed inside the plastic barrel 408 along an optical axis of the plastic optical lens assembly 409.

Figure 4B:
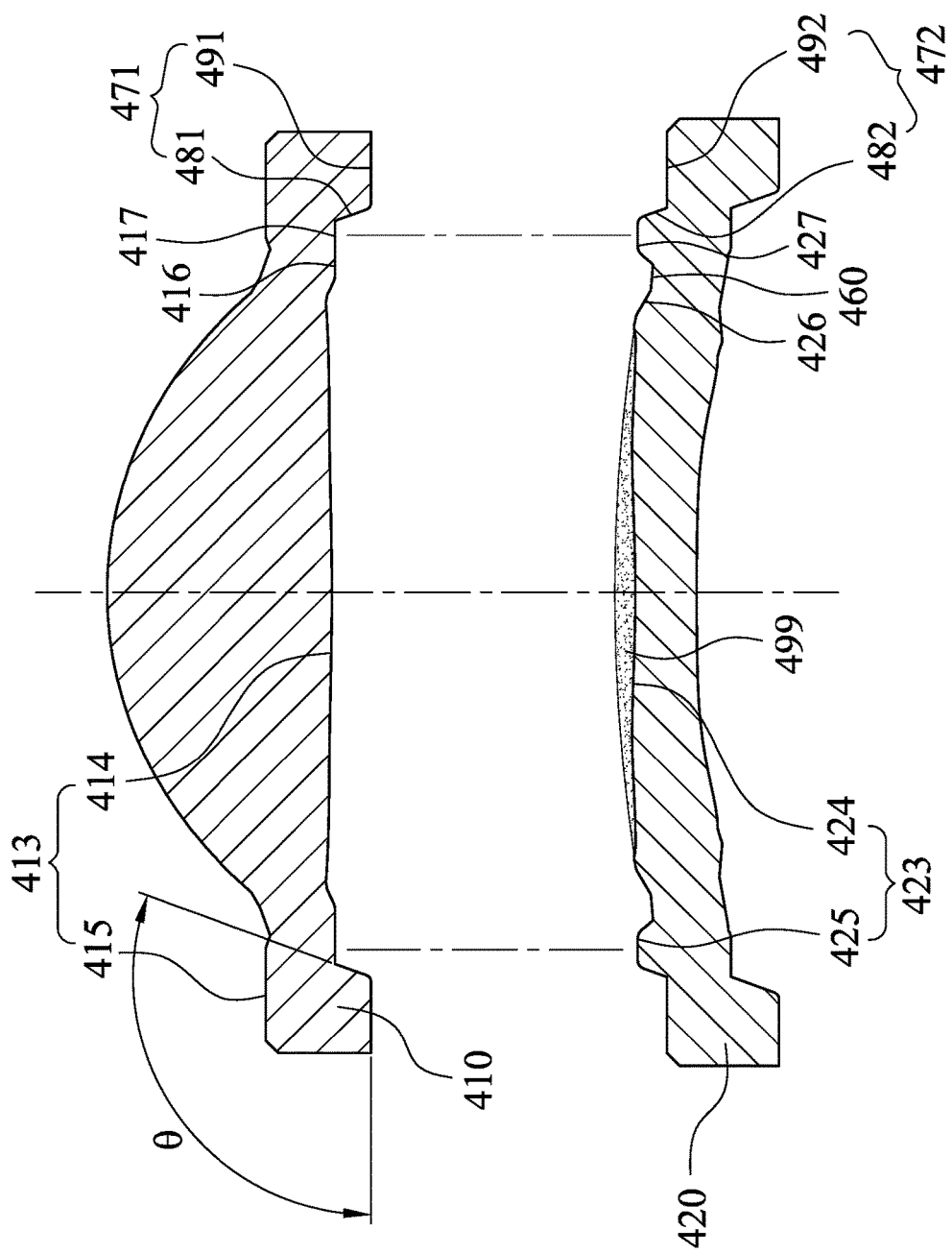
FIG. 4B is a schematic view of assembling the first lens element and the second lens element according to the 4th embodiment.

The cemented lens element formed by the first lens element 410 and the second lens element 420 will be firstly discussed. FIG. 4B is a schematic view of assembling the first lens element 410 and the second lens element 420 according to the 4th embodiment. In FIG. 4A and FIG. 4B, the first lens element 410 includes a first surface 413. The first surface 413 includes a first optical effective portion 414 and a first peripheral portion 415, wherein the first peripheral portion 415 surrounds the first optical effective portion 414. The second lens element 420 includes a second surface 423. The second surface 423 includes a second optical effective portion 424 and a second peripheral portion 425, wherein the second optical effective portion 424 is disposed correspondingly to the first optical effective portion 414, and the second peripheral portion 425 surrounds the second optical effective portion 424. In the 4th embodiment, the first surface 413 is the surface of the first lens element 410 facing the image surface 456, and the first optical effective portion 414 is convex in a paraxial region thereof. The second surface 423 is the surface of the second lens element 420 facing an imaged object (not shown), and the second optical effective portion 424 is concave in a paraxial region thereof.

Figure 4C:
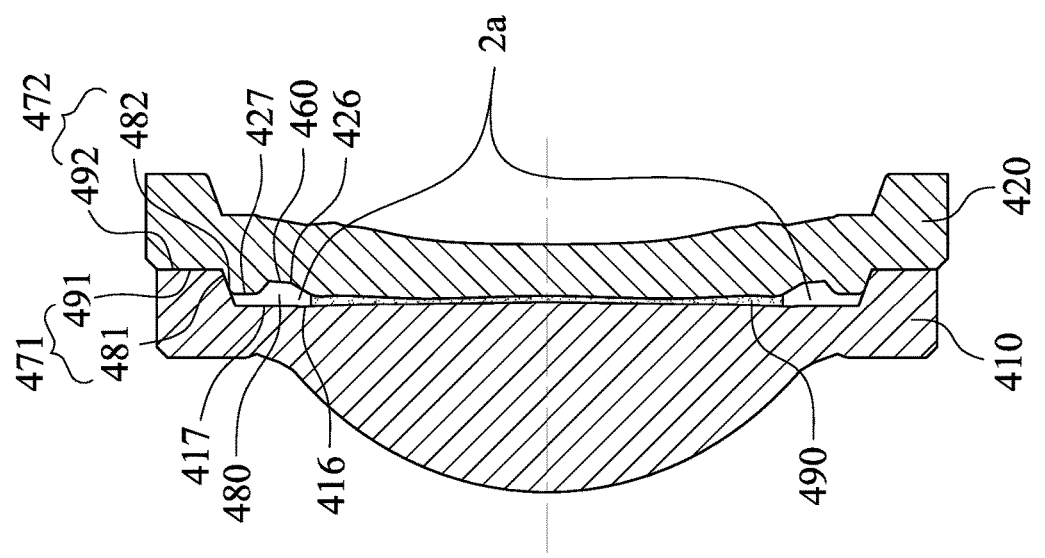
FIG. 4C is a schematic view of a parameter 2a of the plastic optical lens assembly according to the 4th embodiment.

FIG. 4C is a schematic view of a parameter 2a of the plastic optical lens assembly 409 according to the 4th embodiment. In FIG. 4A and FIG. 4C, the cementing glue coating 490 is disposed between the first optical effective portion 414 and the second optical effective portion 424, and the cementing glue coating 490 cements the first lens element 410 and the second lens element 420. That is, the first lens element 410 and the second lens element 420 are cemented to form the cemented lens element via cementing the first optical effective portion 414 and the second optical effective portion 424.

Specifically, in FIG. 4A and FIG. 4B, the first peripheral portion 415 includes a first spacing section 416 and a first engaging structure 471. The first spacing section 416 is located between the first optical effective portion 414 and the first engaging structure 471. The second peripheral portion 425 includes a second spacing section 426 and a second engaging structure 472. The second spacing section 426 is located between the second optical effective portion 424 and the second engaging structure 472, wherein the first engaging structure 471 is engaged with the second engaging structure 472 for aligning the first optical effective portion 414 with the second optical effective portion 424, and a reference space 480 is formed between the first spacing section 416 and the second spacing section 426, wherein the reference space 480 is an air gap between the first spacing section 416 and the second spacing section 426.

In other words, the first peripheral portion 415 includes the first plane section 417 and the first engaging structure 471. The first plane section 417 is perpendicular to the optical axis of the plastic optical lens assembly 409 and is located between the first optical effective portion 414 and the first engaging structure 471. The second peripheral portion 425 includes the second plane section 427 and the second engaging structure 472. The second plane section 427 is perpendicular to the optical axis and is located between the second optical effective portion 424 and the second engaging structure 472, wherein the first engaging structure 471 is engaged with the second engaging structure 472 for aligning the first optical effective portion 414 with the second optical effective portion 424, and a reference gap 488 is formed between the first plane section 417 and the second plane section 427, wherein the reference gap 488 is an air gap between the first plane section 417 and the second plane section 427.

Figure 4D:
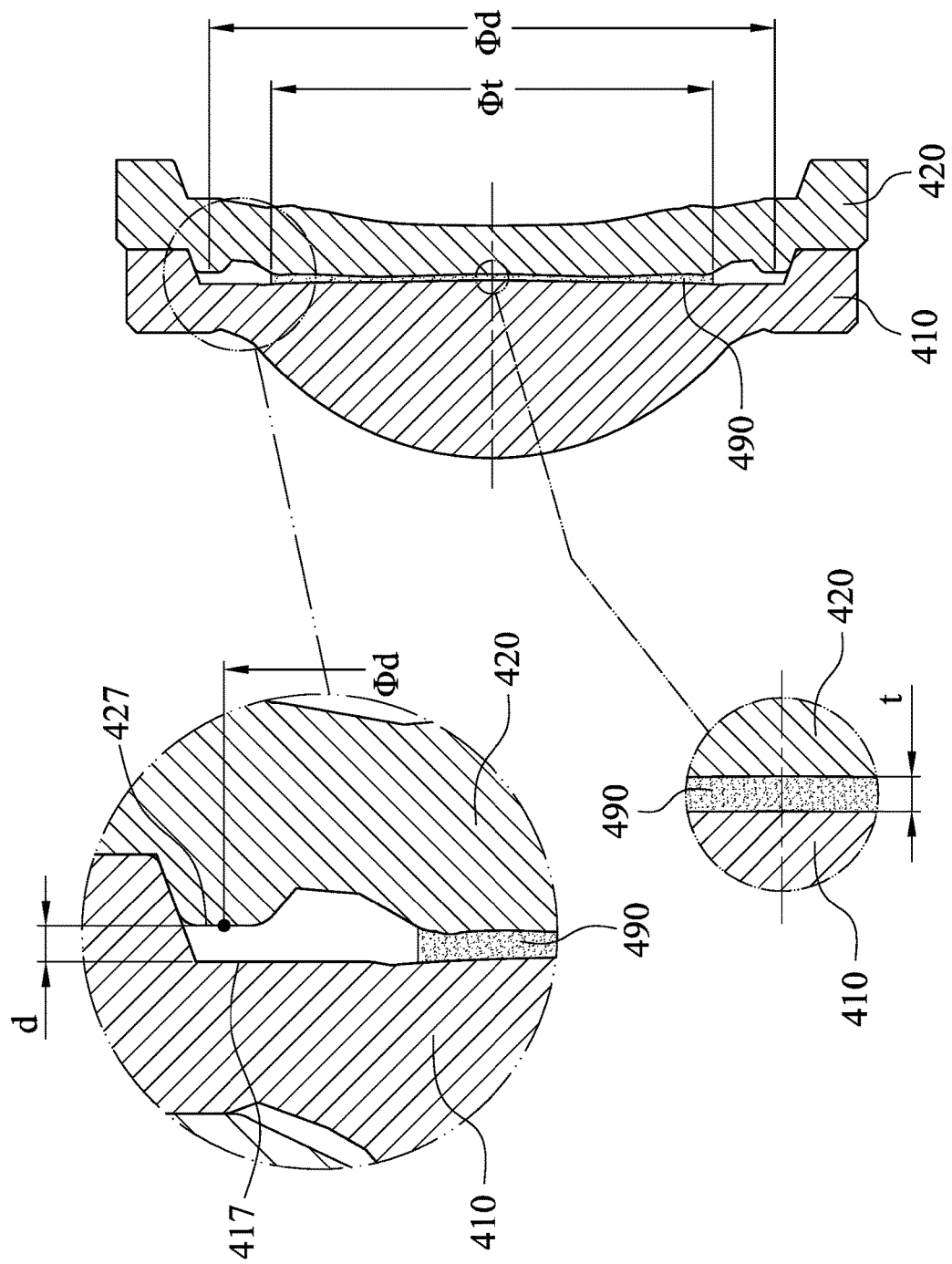
FIG. 4D is a schematic view of parameters φd, φt, d, and t of the plastic optical lens assembly according to the 4th embodiment.

FIG. 4D is a schematic view of parameters φd, φt, d, and t of the plastic optical lens assembly 409 according to the 4th embodiment. In FIG. 4D, both of the first plane section 417 and the second plane section 427 surround the optical axis and are perpendicular to the annular surface of the optical axis. The one of the first plane section 417 and the second plane section 427 with shorter annular width is the second plane section 427. A width midpoint of the second plane section 427 forms a circle that regards the optical axis as a center, and the diameter thereof is φd.

Specifically, in FIG. 4B, during the assembling process of cementing the first lens element 410 and the second lens element 420 with the cementing glue coating 490, the second lens element 420 is firstly placed on a lens platform (not shown) with the second surface 423 facing an upward direction. Next, a non-solid cementing glue 499 whose volume has been estimated is injected as a single drop to the center of the second optical effective portion 424. The first lens element 410 is engaged with the second engaging structure 472 via the first engaging structure 471 with the first surface 413 facing a downward direction, such that the non-solid cementing glue 499 compressed by the first lens element 410 and the second lens element 420 radially spreads to the directions of the first peripheral portion 415 and the second peripheral portion 425 from the center of the first optical effective portion 414 and the center of the second optical effective portion 424. The non-solid cementing glue 499 subsequently hardens to be the cementing glue coating 490 cementing the first lens element 410 and the second lens element 420, such that the first lens element 410 and the second lens element 420 are cemented with each other to form the cemented lens element.

In FIG. 4B and FIG. 4C, the first engaging structure 471 includes a first conical surface 481 and a first abutting area 491. The first conical surface 481 is a conical annular surface regarding the optical axis as the central line. The first abutting area 491 is perpendicular to the optical axis and is farther away from the first optical effective portion 414 than the first conical surface 481 is thereto. The second engaging structure 472 includes a second conical surface 482 and a second abutting area 492. The second conical surface 482 is a conical annular surface regarding the optical axis as the central line. The second abutting area 492 is perpendicular to the optical axis and is farther away from the second optical effective portion 424 than the second conical surface 482 is thereto. The first conical surface 481 is contacted with the second conical surface 482, and the first abutting area 491 is contacted with the second abutting area 492 to engage the first engaging structure 471 with the second engaging structure 472 for aligning the first optical effective portion 414 with the second optical effective portion 424.

In FIG. 4A and FIG. 4C, the first spacing section 416 includes the first plane section 417 which is perpendicular to the optical axis. The second spacing section 426 includes the second plane section 427 which is perpendicular to the optical axis. Both of the first plane section 417 and the second plane section 427 have no contact with the cementing glue coating 490. Further, the reference space 480 includes the reference gap 488.

In FIG. 4B and FIG. 4C, the second spacing section 426 includes an annular groove 460 which corresponds to the near surface recess thereof. In other words, the annular groove 460 is included between the second optical effective portion 424 and the second plane section 427.

The first plane section 417 is connected with the first conical surface 481, and the first conical surface 481 is connected with the first abutting area 491. Meanwhile, the second plane section 427 is connected with the second conical surface 482, and the second conical surface 482 is connected with the second abutting area 492.

Please refer to the following Table 4-1, which lists the data defined based on the aforementioned parameters φd, φt, (φd−φt)/2, φd−φt, θ, Ra, d, t, d/t, and 2a (whose definitions are the same as those of the plastic optical lens assembly 109 of the imaging lens module 100 of the 1st embodiment) of the first lens element 410 and the second lens element 420 of the imaging lens module 400 of the 4th embodiment as illustrated in FIG. 4B to FIG. 4D.

TABLE 4-1 the first lens element 410 and the second lens element 420 of the 4th embodiment

| | | | |
|---|---|---|---|
| φd (mm) | 2.79 | Ra (μm) | 0.4-0.8 |
| φt (mm) | 2.18 | d (mm) | 0.057 |
| (φd − φt)/2 (mm) | 0.305 | t (mm) | 0.03 |
| φd − φt (mm) | 0.610 | d/t | 1.900 |
| θ (degrees) | 110 | 2a (mm$^2$) | 0.0606 |

Figure 4E:
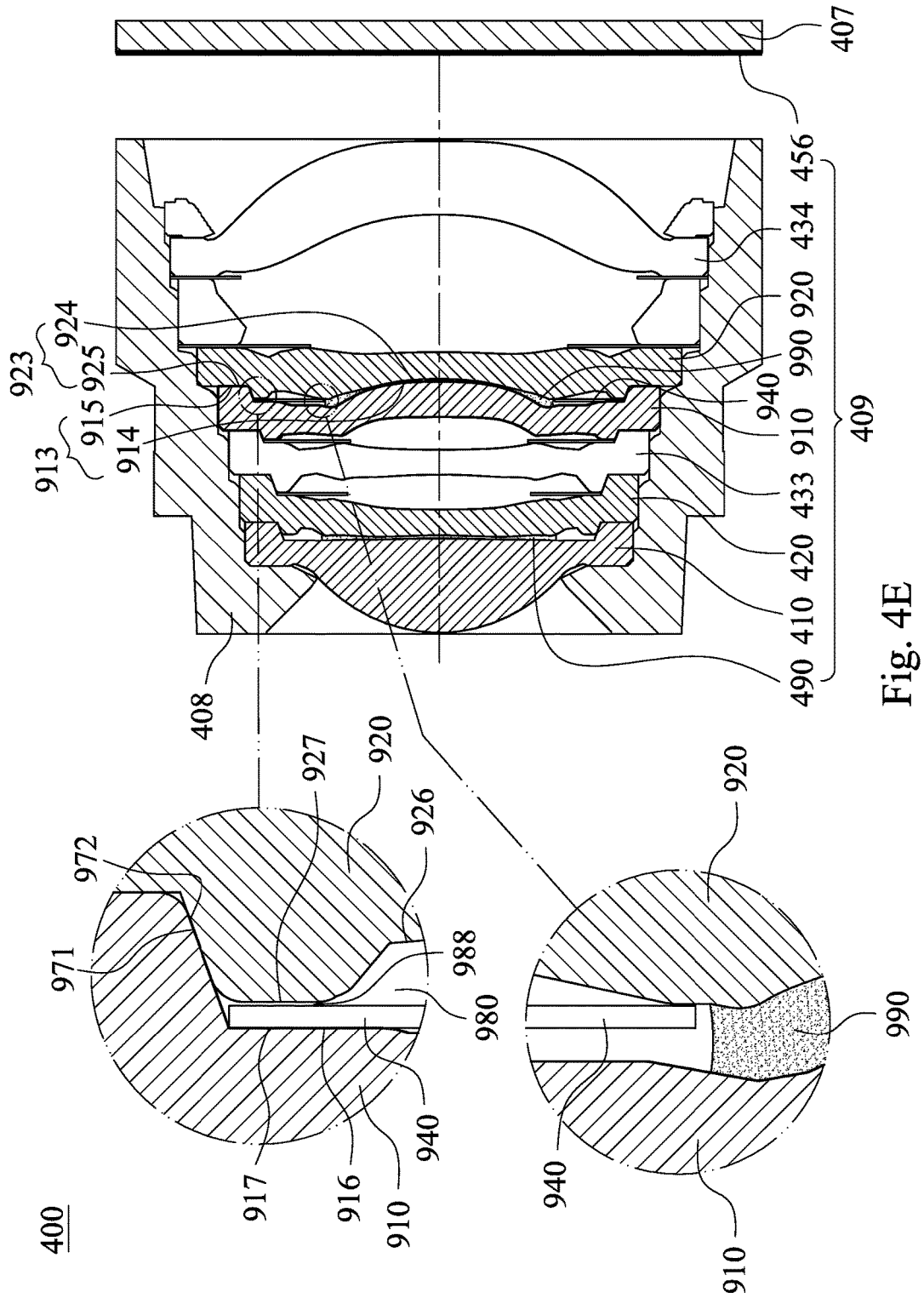
FIG. 4E is another schematic view of the imaging lens module according to the 4th embodiment of the present disclosure.
Figure 4F:
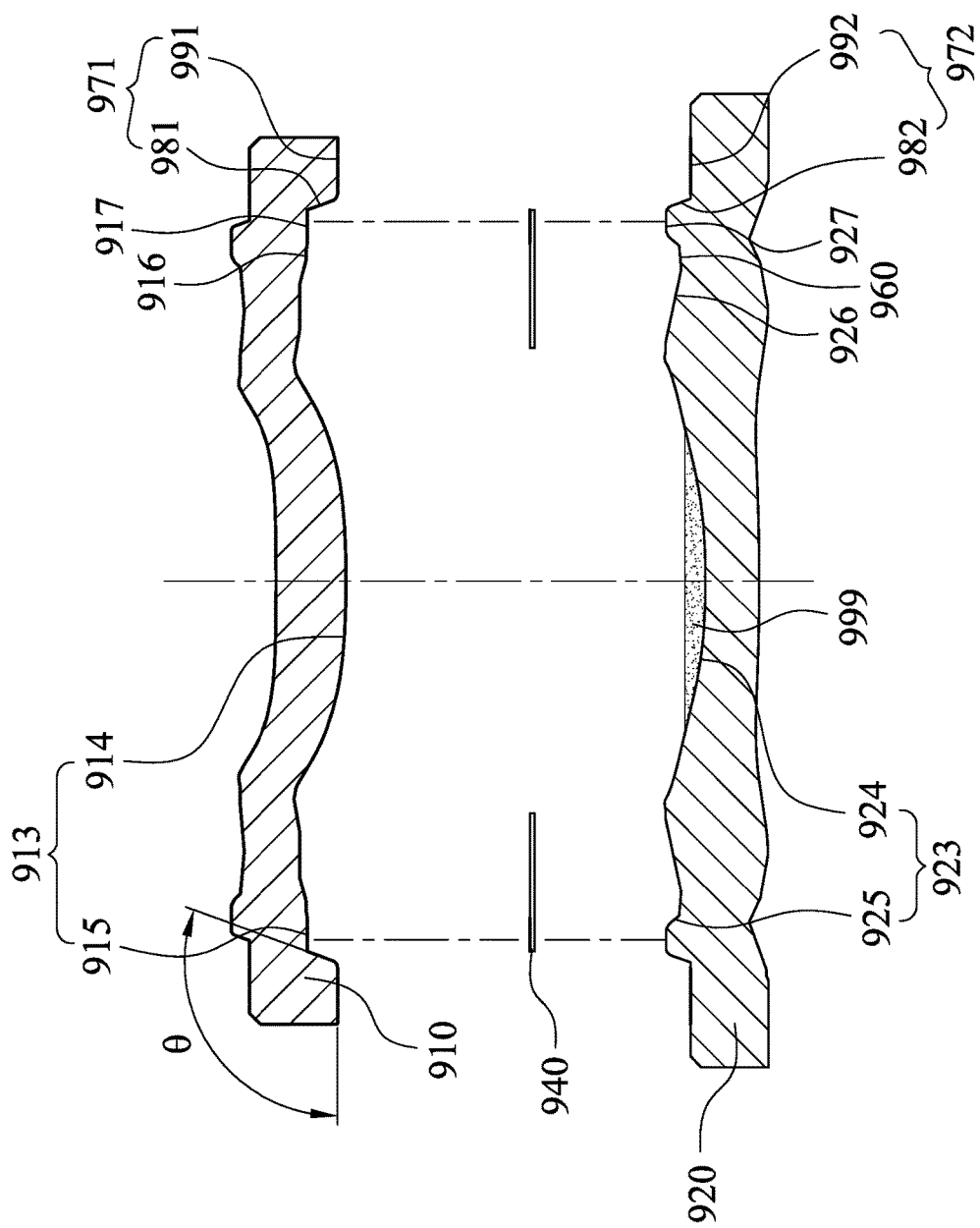
FIG. 4F is a schematic view of assembling the first lens element and the second lens element according to the 4th embodiment

Next, the cemented lens element formed by the first lens element 910 and the second lens element 920 will be discussed. FIG. 4E is another schematic view of the imaging lens module 400 according to the 4th embodiment of the present disclosure; FIG. 4F is a schematic view of assembling the first lens element 910 and the second lens element 920 according to the 4th embodiment. In FIG. 4E and FIG. 4F, the first lens element 910 includes a first surface 913. The first surface 913 includes a first optical effective portion 914 and a first peripheral portion 915, wherein the first peripheral portion 915 surrounds the first optical effective portion 914. The second lens element 920 includes a second surface 923. The second surface 923 includes a second optical effective portion 924 and a second peripheral portion 925, wherein the second optical effective portion 924 is disposed correspondingly to the first optical effective portion 914, and the second peripheral portion 925 surrounds the second optical effective portion 924. In the 4th embodiment, the first surface 913 is the surface of the first lens element 910 facing the image surface 456, and the first optical effective portion 914 is convex in a paraxial region thereof. The second surface 923 is the surface of the second lens element 920 facing an imaged object (not shown), and the second optical effective portion 924 is concave in a paraxial region thereof.

Figure 4G:
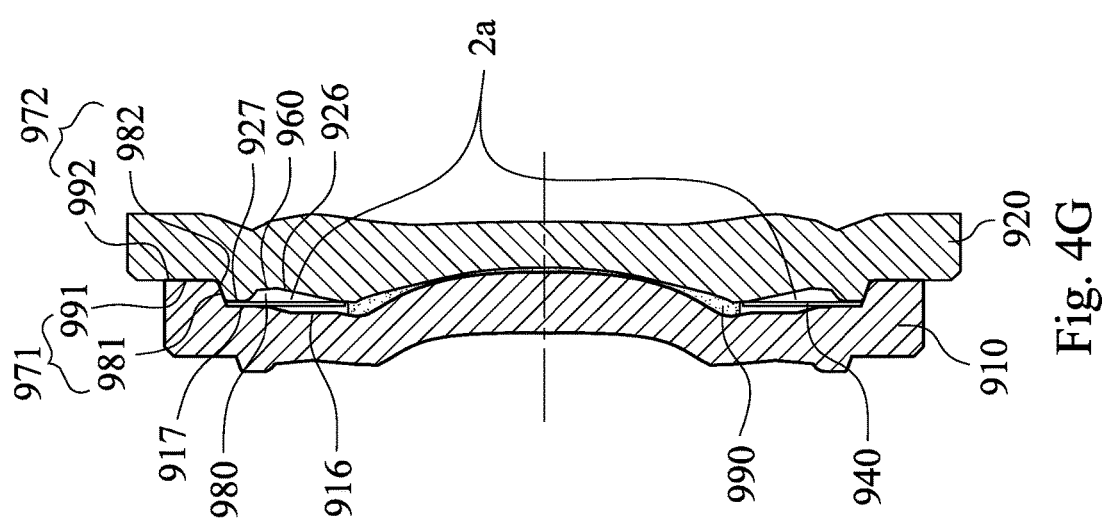
FIG. 4G is another schematic view of a parameter 2a of the plastic optical lens assembly according to the 4th embodiment.

FIG. 4G is another schematic view of a parameter 2a of the plastic optical lens assembly 409 according to the 4th embodiment. In FIG. 4E and FIG. 4G, the cementing glue coating 990 is disposed between the first optical effective portion 914 and the second optical effective portion 924, and the cementing glue coating 990 cements the first lens element 910 and the second lens element 920. That is, the first lens element 910 and the second lens element 920 are cemented to form the cemented lens element via cementing the first optical effective portion 914 and the second optical effective portion 924.

Specifically, in FIG. 4E and FIG. 4F, the first peripheral portion 915 includes a first spacing section 916 and a first engaging structure 971. The first spacing section 916 is located between the first optical effective portion 914 and the first engaging structure 971. The second peripheral portion 925 includes a second spacing section 926 and a second engaging structure 972. The second spacing section 926 is located between the second optical effective portion 924 and the second engaging structure 972, wherein the first engaging structure 971 is engaged with the second engaging structure 972 for aligning the first optical effective portion 914 with the second optical effective portion 924, and a reference space 980 is formed between the first spacing section 916 and the second spacing section 926, wherein the reference space 980 is an air gap between the first spacing section 916 and the second spacing section 926.

In other words, the first peripheral portion 915 includes the first plane section 917 and the first engaging structure 971. The first plane section 917 is perpendicular to the optical axis of the plastic optical lens assembly 409 and is located between the first optical effective portion 914 and the first engaging structure 971. The second peripheral portion 925 includes the second plane section 927 and the second engaging structure 972. The second plane section 927 is perpendicular to the optical axis and is located between the second optical effective portion 924 and the second engaging structure 972, wherein the first engaging structure 971 is engaged with the second engaging structure 972 for aligning the first optical effective portion 914 with the second optical effective portion 924, and a reference gap 988 is formed between the first plane section 917 and the second plane section 927, wherein the reference gap 988 is an air gap between the first plane section 917 and the second plane section 927.

Figure 4H:
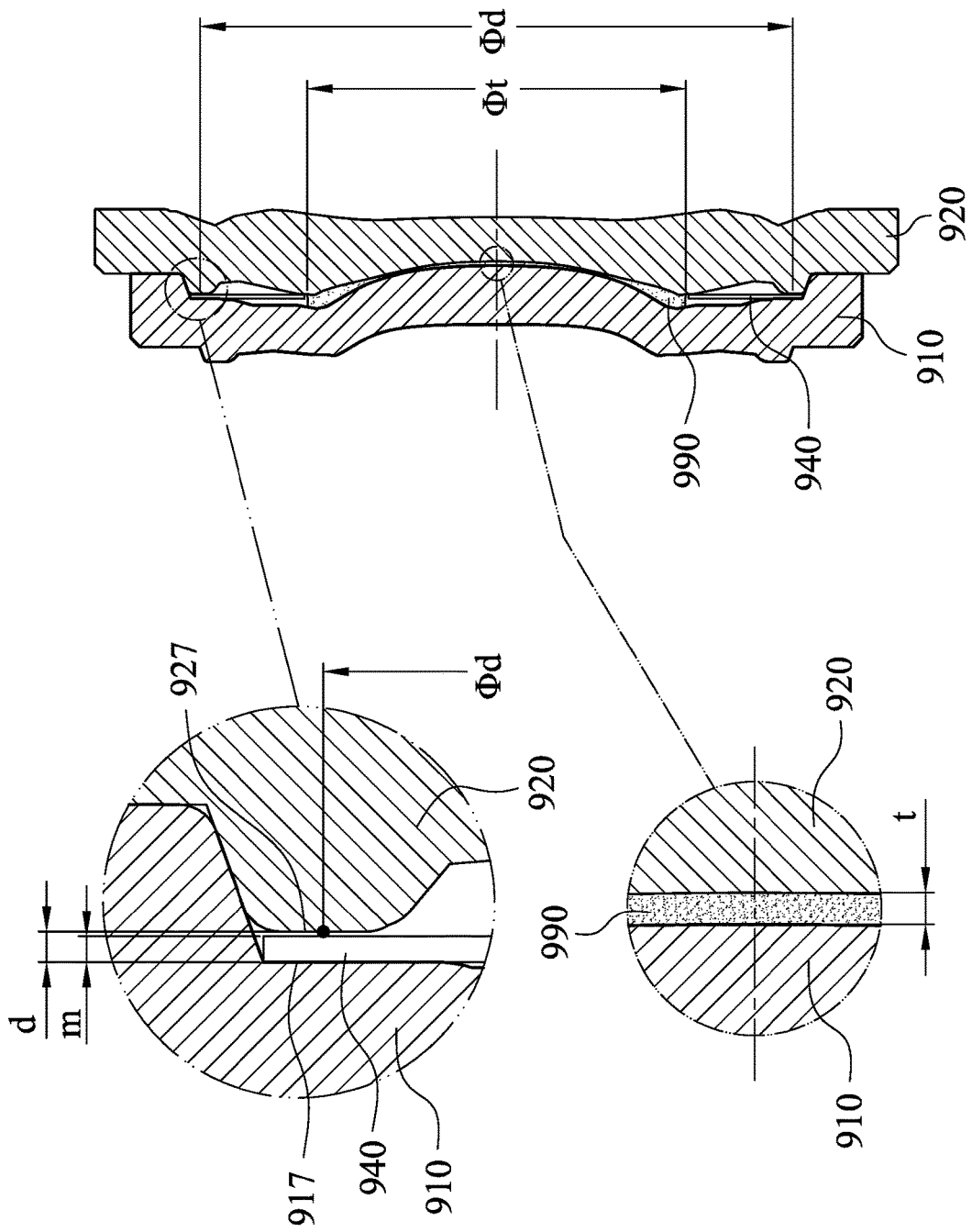
FIG. 4H is another schematic view of parameters φd, φt, d, and t of the plastic optical lens assembly according to the 4th embodiment and a schematic view of a parameter m.

FIG. 4H is another schematic view of parameters φd, φt, d, and t of the plastic optical lens assembly 409 according to the 4th embodiment and a schematic view of a parameter m. In FIG. 4H, both of the first plane section 917 and the second plane section 927 surround the optical axis and are perpendicular to the annular surface of the optical axis. The one of the first plane section 917 and the second plane section 927 with shorter annular width is the second plane section 927. A width midpoint of the second plane section 927 forms a circle that regards the optical axis as a center, and the diameter thereof is φd.

Specifically, in FIG. 4F, during the assembling process of cementing the first lens element 910 and the second lens element 920 with the cementing glue coating 990, the second lens element 920 is firstly placed on a lens platform (not shown) with the second surface 923 facing an upward direction. Next, a non-solid cementing glue 999 whose volume has been estimated is injected as a single drop to the center of the second optical effective portion 924. The first lens element 910 is engaged with the second engaging structure 972 via the first engaging structure 971 with the first surface 913 facing a downward direction, and a light blocking sheet 940 is assembled between the first surface 913 and the second surface 923, such that the non-solid cementing glue 999 compressed by the first lens element 910 and the second lens element 920 radially spreads to the directions of the first peripheral portion 915 and the second peripheral portion 925 from the center of the first optical effective portion 914 and the center of the second optical effective portion 924. The non-solid cementing glue 999 subsequently hardens to be the cementing glue coating 990 cementing the first lens element 910 and the second lens element 920, such that the first lens element 910 and the second lens element 920 are cemented with each other to form the cemented lens element.

In FIG. 4F and FIG. 4G, the first engaging structure 971 includes a first conical surface 981 and a first abutting area 991. The first conical surface 981 is a conical annular surface regarding the optical axis as the central line. The first abutting area 991 is perpendicular to the optical axis and is farther away from the first optical effective portion 914 than the first conical surface 981 is thereto. The second engaging structure 972 includes a second conical surface 982 and a second abutting area 992. The second conical surface 982 is a conical annular surface regarding the optical axis as the central line. The second abutting area 992 is perpendicular to the optical axis and is farther away from the second optical effective portion 924 than the second conical surface 982 is thereto. The first conical surface 981 is contacted with the second conical surface 982, and the first abutting area 991 is contacted with the second abutting area 992 to engage the first engaging structure 971 with the second engaging structure 972 for aligning the first optical effective portion 914 with the second optical effective portion 924.

In FIG. 4E and FIG. 4G, the first spacing section 916 includes the first plane section 917 which is perpendicular to the optical axis. The second spacing section 926 includes the second plane section 927 which is perpendicular to the optical axis. Both of the first plane section 917 and the second plane section 927 have no contact with the cementing glue coating 990. Further, the reference space 980 includes the reference gap 988.

In FIG. 4F and FIG. 4G, the second spacing section 926 includes an annular groove 960 which corresponds to the near surface recess thereof. In other words, the annular groove 960 is included between the second optical effective portion 924 and the second plane section 927.

The first plane section 917 is connected with the first conical surface 981, and the first conical surface 981 is connected with the first abutting area 991. Meanwhile, the second plane section 927 is connected with the second conical surface 982, and the second conical surface 982 is connected with the second abutting area 992.

In FIG. 4E, the plastic optical lens assembly 409 further includes the light blocking sheet 940 which is disposed between the first plane section 917 and the second plane section 927, or it can also be said that the light blocking sheet 940 is disposed in the reference gap 988, wherein in one time, one of the first plane section 917 and the second plane section 927 receives the light blocking sheet 940.

Please refer to the following Table 4-2, which lists the data defined based on the aforementioned parameters φd, φt, (φd−φt)/2, φd−φt, θ, Ra, d, t, d/t, m, d−m, and 2a (whose definitions are the same as those of the plastic optical lens assembly 109 of the imaging lens module 100 of the 1st embodiment and the plastic optical lens assembly 209 of the imaging lens module 200 of the 2nd embodiment) of the first lens element 910 and the second lens element 920 of the imaging lens module 400 of the 4th embodiment as illustrated in FIG. 4F to FIG. 4H.

TABLE 4-2 the first lens element 910 and the second lens element 920 of the 4th embodiment

| | | | |
|---|---|---|---|
| φd (mm) | 3.32 | d (mm) | 0.027 |
| φt (mm) | 2.11 | t (mm) | 0.024 |
| (φd − φt)/2 (mm) | 0.605 | d/t | 1.125 |
| φd − φt (mm) | 1.210 | m (mm) | 0.023 |
| θ (degrees) | 110 | d − m (mm) | 0.004 |
| Ra (µm) | 2.24-3.15 | 2a (mm$^2$) | 0.1042 |

5th Embodiment

Figure 5A:
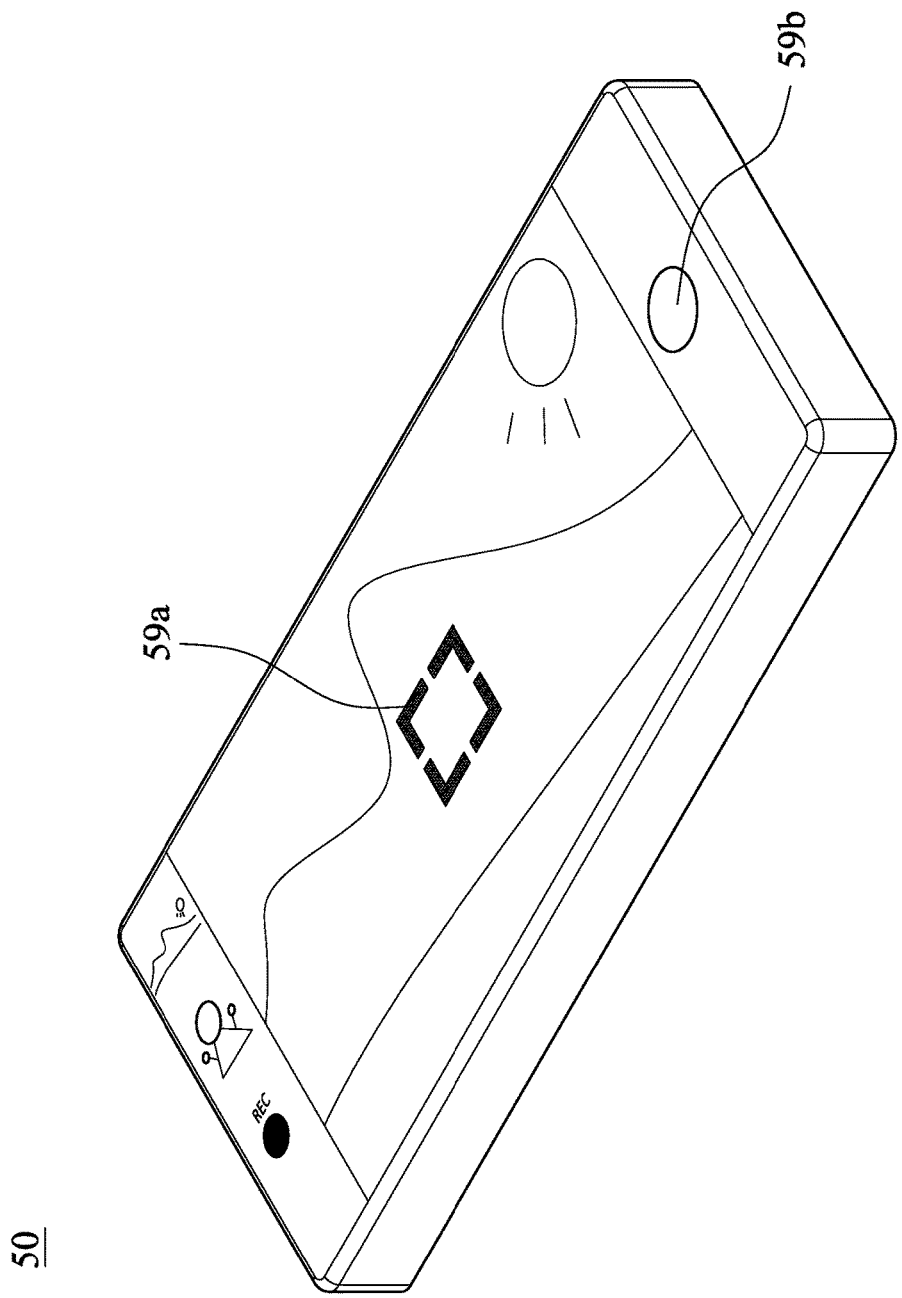
FIG. 5A is a schematic view of an electronic device of the 5th embodiment of the present disclosure.
Figure 5B:
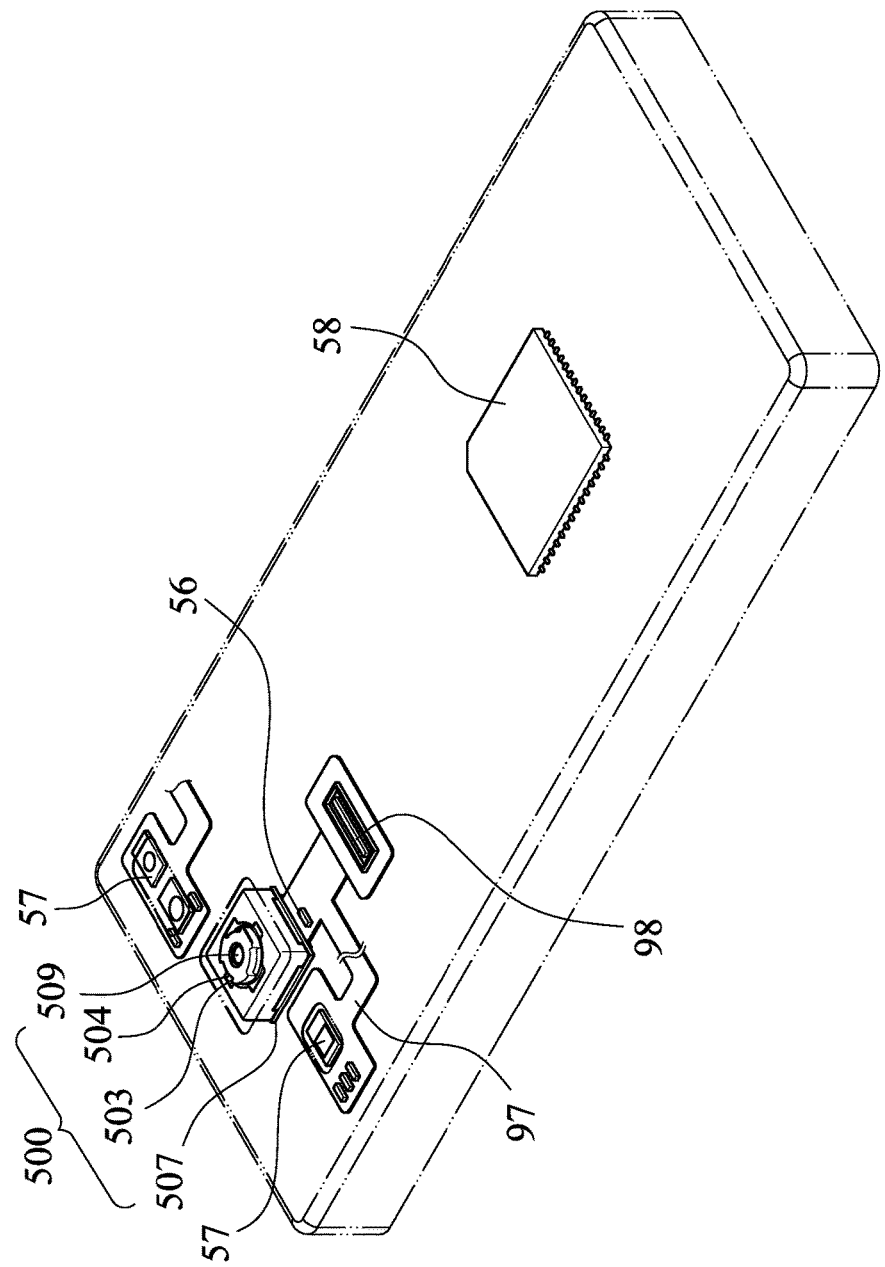
FIG. 5B is another schematic view of the electronic device of the 5th embodiment of the present disclosure.

FIG. 5A is a schematic view of an electronic device 50 of the 5th embodiment of the present disclosure, FIG. 5B is another schematic view of the electronic device 50 of the 5th embodiment of the present disclosure, and particularly, FIG. 5A and FIG. 5B are schematic views of a camera of the electronic device 50. In FIG. 5A and FIG. 5B, the electronic device 50 of the 5th embodiment is a smart phone which includes the imaging lens module 500 of the present disclosure. The imaging lens module 500 includes the plastic optical lens assembly 509 according to the present disclosure and an image sensor 507, wherein the image sensor 507 is disposed on an image surface of the plastic optical lens assembly 509. Accordingly, a better image quality can be achieved, and hence the high specification of imaging requirement of modern electronic devices can be satisfied.

Specifically, the user activates the capturing mode via the user interface 59 of the electronic device 50, wherein the user interface 59 of the 5th embodiment can be a touch screen 59a, a button 59b, etc. At this moment, the plastic optical lens assembly 509 of the imaging lens module 500 collects imaging lights on the image sensor 507 and outputs electronic signals associated with images to an image signal processor (ISP) 58.

FIG. 5C is a block diagram of the electronic device 50 of the 5th embodiment, in particular, the block diagram of the camera of the electronic device 50. In FIG. 5A to FIG. 5C, the imaging lens module 500 can further include an auto focus component 503 and an optical anti-shake component 504 in response to the camera specification of the electronic device 50 in response to the camera specification of the electronic device 50. Moreover, the electronic device 50 can further include at least one auxiliary optical element 57 and at least one sensing element 56. The auxiliary optical element 57 can be flash modules, infrared distance measurement components, laser focus modules and modules for compensating for color temperatures. The sensing element 56 can have functions for sensing physical momentum and kinetic energies, such as an accelerator, a gyroscope, and a hall effect element, to sense shaking or jitters applied by hands of the user or external environments. As a result, the auto focus component 503 and the optical anti-shake component 504 disposed on the electronic device 50 can function to obtain great imaging qualities and facilitate the electronic device 50 according to the present disclosure to have a capturing function with multiple modes, such as taking optimized selfies, high dynamic range (HDR) with a low light source, 4K resolution recording, etc. Additionally, the user can visually see the captured image of the camera through the touch screen and manually operate the view finding range on the touch screen to achieve the auto focus function of what you see is what you get.

Furthermore, in FIG. 5B, the imaging lens module 500, the sensing element 56, and the auxiliary optical element 57 can be disposed on a flexible printed circuitboard (FPC) 97 and electrically connected with the associated elements, such as an imaging signal processing element 58, via a connector 98 to perform a capturing process. Since the current electronic devices, such as smartphones, have a tendency of being light and thin, the way of firstly disposing the imaging lens module and related elements on the flexible printed circuitboard and secondly integrating the circuit into the main board of the electronic device via the connector can satisfy the mechanical design of the limited space inside the electronic device and the layout requirements and obtain more margins. The auto focus function of the imaging lens module can be controlled more flexibly via the touch screen of the electronic device. In the 5th embodiment, the electronic device 50 includes a plurality of sensing elements 56 and a plurality of auxiliary optical elements 57. The sensing elements 56 and the auxiliary optical elements 57 are disposed on the flexible printed circuitboard 97 and at least one other flexible printed circuitboard (not labelled particularly) and electrically connected with the associated elements, such as an imaging signal processing element 58, via corresponding connectors to perform a capturing process. In other embodiments (not shown), the sensing elements and the auxiliary optical elements can also be disposed on the main board of the electronic device or carrier boards in other forms according to requirements of the mechanical design and the circuit layout.

In addition, the electronic device 50 can further include, but not be limited to, a display, a control unit, a storage unit, a random access memory, a read-only memory, or the combination thereof.

6th Embodiment

Figure 6:
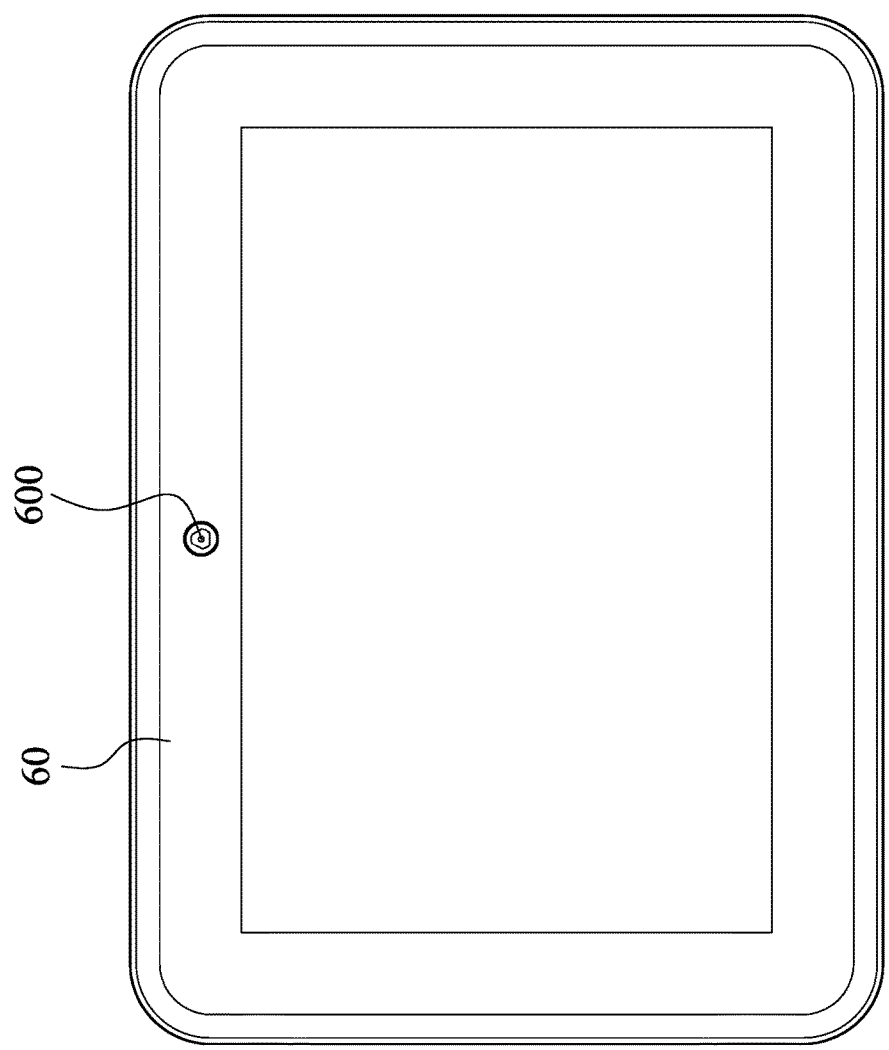
FIG. 6 is a schematic view of an electronic device according to the 6th embodiment of the present disclosure.

FIG. 6 is a schematic view of an electronic device 60 according to the 6th embodiment of the present disclosure. The electronic device 60 of the 6th embodiment is a tablet, and the electronic device 60 includes an imaging lens module 600 which includes a plastic optical lens assembly (not shown) according to the present disclosure and an image sensor (not shown), wherein the image sensor is disposed on an image surface (not shown) of the plastic optical lens assembly.

7th Embodiment

Figure 7:
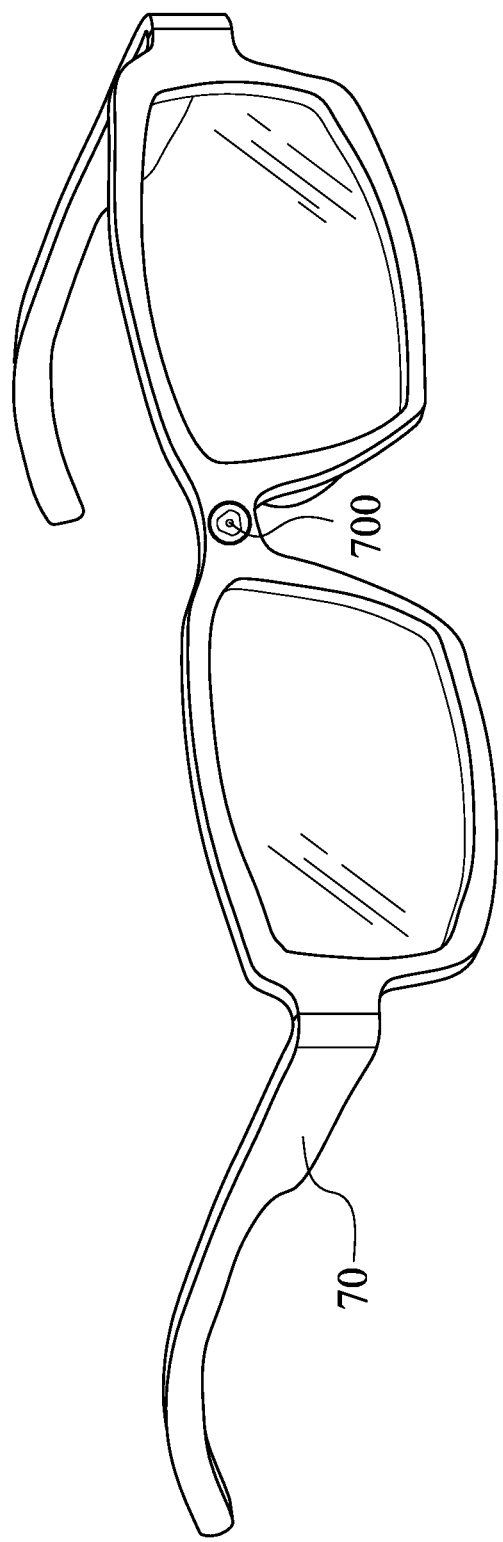
FIG. 7 is a schematic view of an electronic device according to the 7th embodiment of the present disclosure.

FIG. 7 is a schematic view of an electronic device 70 according to the 7th embodiment of the present disclosure. The electronic device 70 of the 7th embodiment is a wearable device, and the electronic device 70 includes an imaging lens module 700 which includes a plastic optical lens assembly (not shown) according to the present disclosure and an image sensor (not shown), wherein the image sensor is disposed on an image surface (not shown) of the plastic optical lens assembly.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A plastic optical lens assembly, comprising:
a first lens element comprising a first surface, wherein the first surface comprises:
a first optical effective portion; and
a first peripheral portion surrounding the first optical effective portion, wherein the first peripheral portion comprises a first spacing section and a first engaging structure, and the first spacing section is located between the first optical effective portion and the first engaging structure;
a second lens element comprising a second surface, wherein the second surface comprises:
a second optical effective portion disposed correspondingly to the first optical effective portion; and
a second peripheral portion surrounding the second optical effective portion, wherein the second peripheral portion comprises a second spacing section and a second engaging structure, the second spacing section is located between the second optical effective portion and the second engaging structure, the first engaging structure is engaged with the second engaging structure for aligning the first optical effective portion with the second optical effective portion, and a reference space is formed between the first spacing section and the second spacing section; and
a cementing glue coating being at least disposed between the first optical effective portion and the second optical effective portion, and the cementing glue coating cementing the first lens element and the second lens element;
wherein the first engaging structure comprises a first conical surface and a first abutting area, wherein the first abutting area is perpendicular to an optical axis of the plastic optical lens assembly and is farther away from the first optical effective portion than the first conical surface is thereto;
wherein the second engaging structure comprises a second conical surface and a second abutting area, wherein the second abutting area is perpendicular to the optical axis and is farther away from the second optical effective portion than the second conical surface is thereto, and the first conical surface is contacted with the second conical surface, the first abutting area is contacted with the second abutting area;

wherein an angle between the first conical surface and the first abutting area is θ, and the following condition is satisfied:

90 degrees≤θ≤130 degrees.

2. The plastic optical lens assembly of claim 1, wherein at least one of the first spacing section and the second spacing section comprises an annular groove.

3. The plastic optical lens assembly of claim 2, wherein a surface roughness of the annular groove is Ra, and the following condition is satisfied:

0.1 μm<Ra<4.0 μm.

4. The plastic optical lens assembly of claim 1, wherein the first spacing section comprises a first plane section being perpendicular to the optical axis, and the second spacing section comprises a second plane section being perpendicular to the optical axis.

5. The plastic optical lens assembly of claim 4, wherein both of the first plane section and the second plane section have no contact with the cementing glue coating.

6. The plastic optical lens assembly of claim 4, wherein the first plane section is connected with the first conical surface, and the first conical surface is connected with the first abutting area.

7. The plastic optical lens assembly of claim 4, further comprising:

a light blocking sheet disposed between the first plane section and the second plane section, wherein one of the first plane section and the second plane section receives the light blocking sheet.

8. The plastic optical lens assembly of claim 4, wherein a distance between the first plane section and the second plane section is d, and the following condition is satisfied:

0.002 mm<d<0.06 mm.

9. The plastic optical lens assembly of claim 4, wherein a distance between the first plane section and the second plane section is d, a thickness of the cementing glue coating on the optical axis is t, and the following condition is satisfied:

0.25<d/t<4.0.

10. The plastic optical lens assembly of claim 7, wherein a distance between the first plane section and the second plane section is d, a thickness of the light blocking sheet is m, and the following condition is satisfied:

0.002 mm<d−m<0.015 mm.

11. The plastic optical lens assembly of claim 1, wherein an angle between the first conical surface and the first abutting area is θ, and the following condition is satisfied:

100 degrees≤θ≤120 degrees.

12. The plastic optical lens assembly of claim 1, wherein an area on a cross section where the reference space is coplanar with the optical axis is 2a, and the following condition is satisfied:

0.02 mm²<2a<0.6 mm².

13. An imaging lens module, comprising:
the plastic optical lens assembly of claim 1; and
an image sensor disposed on an image surface of the plastic optical lens assembly.

14. An electronic device, comprising:
the imaging lens module of claim 13.

* * * * *